US010459921B2

(12) United States Patent
Viel et al.

(10) Patent No.: US 10,459,921 B2
(45) Date of Patent: Oct. 29, 2019

(54) PARALLEL DATA STREAM PROCESSING METHOD, PARALLEL DATA STREAM PROCESSING SYSTEM, AND STORAGE MEDIUM

(71) Applicant: FUJITSU LIMITED, Kawasaki-shi, Kanagawa (JP)

(72) Inventors: Emeric Viel, Yokohama (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 535 days.

(21) Appl. No.: 14/943,454

(22) Filed: Nov. 17, 2015

(65) Prior Publication Data

US 2016/0070761 A1 Mar. 10, 2016

Related U.S. Application Data

(63) Continuation of application No. PCT/JP2013/063983, filed on May 20, 2013.

(51) Int. Cl.
*G06F 16/2455* (2019.01)
*G06F 16/2453* (2019.01)

(52) U.S. Cl.
CPC .. *G06F 16/24568* (2019.01); *G06F 16/24532* (2019.01); *G06F 16/24554* (2019.01)

(58) Field of Classification Search
CPC ......... G06F 17/30516; G06F 16/24568; G06F 16/24554
See application file for complete search history.

(56) References Cited

U.S. PATENT DOCUMENTS

| | | | |
|---|---|---|---|
| 5,727,197 | A | 3/1998 | Burgess et al. |
| 7,663,671 | B2 | 2/2010 | Gallagher et al. |
| 7,743,044 | B1 | 6/2010 | Kalogeraki et al. |
| 2008/0028095 | A1 | 1/2008 | Lang et al. |
| 2008/0162409 | A1 | 7/2008 | Meijer et al. |
| 2009/0132503 | A1 | 5/2009 | Sun et al. |

(Continued)

FOREIGN PATENT DOCUMENTS

| | | |
|---|---|---|
| JP | 9-212528 A | 8/1997 |
| JP | 2009-518704 A | 5/2009 |

(Continued)

OTHER PUBLICATIONS

U.S. Office Action dated Sep. 12, 2017 for co-pending U.S. Appl. No. 14/859,453, 18 pages.

(Continued)

*Primary Examiner* — Boris Gorney
*Assistant Examiner* — Christy Y Kim
(74) *Attorney, Agent, or Firm* — Fujitsu Patent Center

(57) ABSTRACT

A non-transitory computer-readable storage medium stores a data stream processing program that causes a computer to execute a process. The process includes extracting a relationship between properties included in events in a data stream from the data stream itself, definitions of queries for processing the data stream, or both of the data stream and the definitions of the queries; specifying a common partitioning key common to a subset of the queries to be grouped into a partitioning group based on partitioning keys in the definitions of the queries, the relationship between the properties, and a probability of the relationship; and assigning the subset of the queries belonging to the partitioning group to each of parallel nodes provided for parallel distributed processing based on the specified common partitioning key.

9 Claims, 28 Drawing Sheets

(56) References Cited

U.S. PATENT DOCUMENTS

| | | | |
|---|---|---|---|
| 2009/0319687 | A1 | 12/2009 | Goldstein et al. |
| 2010/0030741 | A1 | 2/2010 | Johnson et al. |
| 2010/0114870 | A1 | 5/2010 | Al-Omari et al. |
| 2010/0318516 | A1 | 12/2010 | Kolen et al. |
| 2011/0029554 | A1 | 2/2011 | Ito et al. |
| 2011/0040746 | A1 | 2/2011 | Handa et al. |
| 2011/0040827 | A1* | 2/2011 | Katsunuma ....... G06F 17/30516 709/203 |
| 2011/0131198 | A1 | 6/2011 | Johnson et al. |
| 2011/0145828 | A1 | 6/2011 | Takahashi et al. |
| 2014/0372438 | A1 | 12/2014 | Chandramouli et al. |
| 2016/0092517 | A1 | 3/2016 | Viel et al. |

FOREIGN PATENT DOCUMENTS

| | | |
|---|---|---|
| JP | 2011-034255 | 2/2011 |
| JP | 2011-039818 | 2/2011 |
| JP | 2011-076153 | 4/2011 |
| JP | 4925143 | 4/2012 |
| JP | 2012-530289 A | 11/2012 |
| WO | 2007/061728 A1 | 5/2007 |
| WO | 2010/144692 A1 | 12/2010 |

OTHER PUBLICATIONS

Hershberger, John et al., "Adaptive Spatial Partitioning for Multi-dimensional Data Streams", pp. 522-533, Springer-Verlag Berlin Heidelberg, 2004 (12 pages).

Arvind Arasu et al., "CQL: A Language for Continuous Queries over Streams and Relations", Database Programming Languages, Springer-Verlag Berlin Heidelberg, pp. 1-19 (10 pages).

Interstage, Fujitsu, "Interstage Big Data Complex Event Processing Server V1.0.0", Developer's Reference; http://software.fujitsu.com/jp/manual/manualfiles/m120021/j2ul1668/01enz200/j2ul-1668-01enz0-00.pdf (118 pages).

Emerie Viel et al., "Parallelism Extraction in Date Stream Programs", [online], Mar. 2, 2013, [retrieved on Jun. 14, 2013] Retrieved from: ebookbrowse, Internet <URL:http://ebookbrowse.com/parallelism-extraction-in-data-stream-programs-pdf-d457331724>, pp. 1-15 (16 pages).

Annica Ivert, "Linear Programming Optimization of Query Allocation in a Distributed CEP System", Bachelor Thesis, Royal Institute of Technology, [online], 2012, [retrieved on Jun. 14, 2013] Retrieved from: KTH Publication Database DiVA, Internet <URL:http://kth.diva-portal.org/smash/get/diva2:552594/FULLTEXT01>, pp. 1-41 (46 pages).

International Search Report, mailed in connection with PCT/JP2013/063983 and dated Jun. 25, 2013 (1 page).

U.S. Office Action dated Mar. 1, 2018 co-pending U.S. Appl. No. 14/859,453, 29 pages.

U.S. Notice of Allowance dated Aug. 29, 2018 for copending U.S. Appl. No. 14/859,453, 5 pages.

U.S. Corrected Notice of Allowance dated Sep. 27, 2018 for copending U.S. Appl. No. 14/859,453, 7 pages.

* cited by examiner

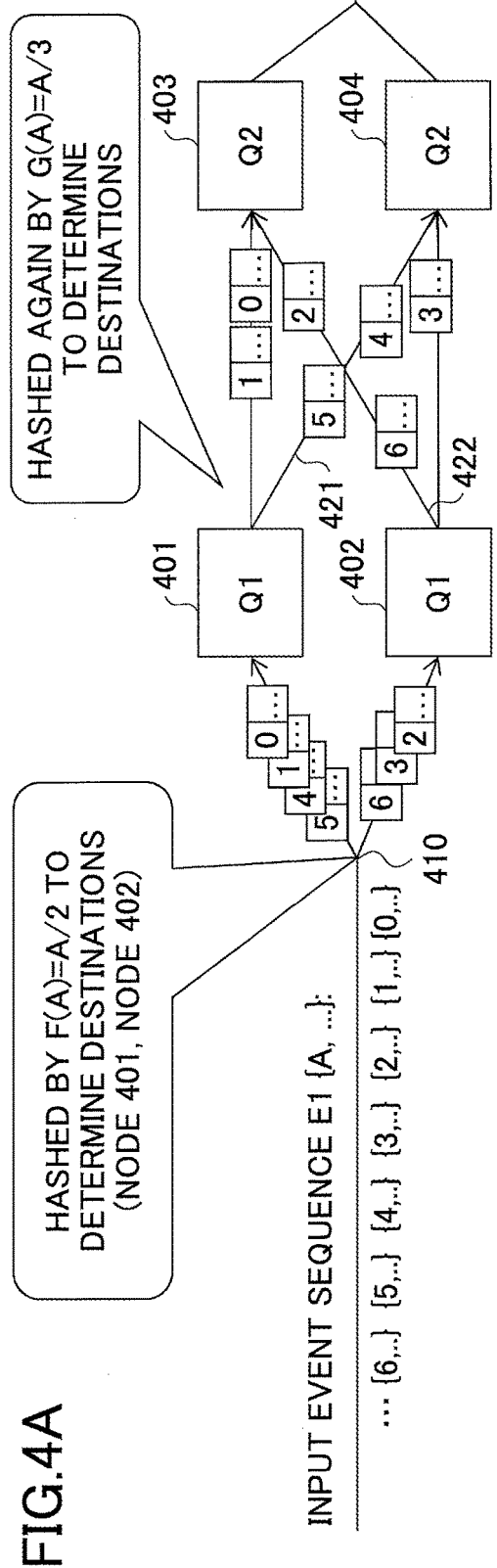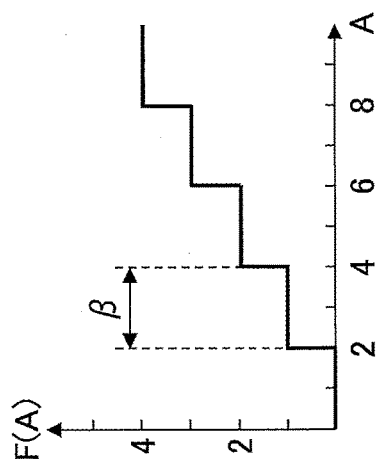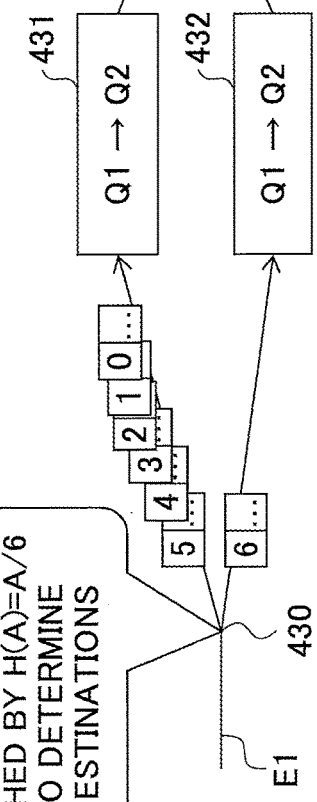
FIG.4A
FIG.4C
FIG.4B

FIG.5

| A | F(A)=<br>A/2 | G(A)=<br>A/3 | H(A)=<br>A/6 |
|---|---|---|---|
| 0 | 0 | 0 | 0 |
| 1 | 0 | 0 | 0 |
| 2 | 1 | 0 | 0 |
| 3 | 1 | 1 | 0 |
| 4 | 2 | 1 | 0 |
| 5 | 2 | 1 | 0 |
| 6 | 3 | 2 | 1 |
| 7 | 3 | 2 | 1 |
| ... | ... | ... | 1 |

FIG.6A
| A | F(A)= A/2 | G(A)= (A+1)/3 | H(A)= A/6 |
|---|---|---|---|
| 0 | 0 | 0 | 0 |
| 1 | 0 | 0 | 0 |
| 2 | 1 | 1 | 0 |
| 3 | 1 | 1 | 0 |
| 4 | 2 | 1 | 0 |
| 5 | 2 | 2 | 0 |
| 6 | 3 | 2 | 1 |
| 7 | 3 | 2 | 1 |
| 8 | 4 | 3 | 1 |
| 9 | 4 | 3 | 1 |
| ... | ... | ... | ... |
FIG.6C
| A | F(A)= A/2 | G(A)= (A+1)/4 | H(A)= A/4 |
|---|---|---|---|
| 0 | 0 | 0 | 0 |
| 1 | 0 | 0 | 0 |
| 2 | 1 | 0 | 0 |
| 3 | 1 | 1 | 0 |
| 4 | 2 | 1 | 1 |
| 5 | 2 | 1 | 1 |
| 6 | 3 | 1 | 1 |
| 7 | 3 | 2 | 1 |
| 8 | 4 | 2 | 2 |
| 9 | 4 | 2 | 2 |
| ... | ... | ... | ... |
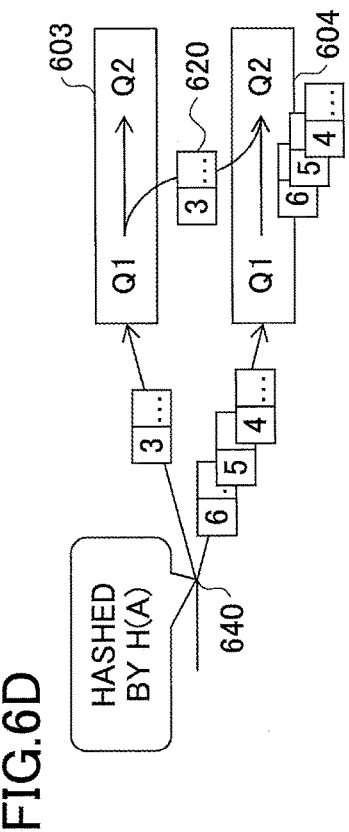
FIG.6B
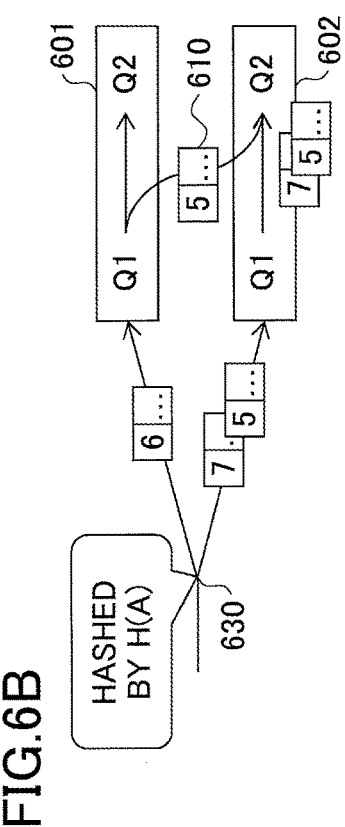
FIG.6D

FIG.12A

| QUERY | INPUT EVENT | PARTITIONING KEY SET |
|---|---|---|
| Q1 | E1 | {A} |
| Q2 | E2 | {B} |

FIG.12B

| EVENT 2 | EVENT 2 PROPERTY | EVENT 1 | EVENT 1 PROPERTY SET | FUNCTION (FORMULA) | MULTI-PLICITY | PROBA-BILITY |
|---|---|---|---|---|---|---|
| E2 | B | E1 | {A} | A/2 | 1:N | 100% |
| E2 | C | E1 | {A, B} | A+B | 1:1 | 100% |
| E3 | B | E2 | {B} | B | 1:1 | 100% |

FIG.12C

| PARTITIONING GROUP | BELONGING QUERY |
|---|---|
| G1 | {Q1, Q2} |

FIG.12D

| PARTITIONING GROUP | INPUT EVENT | PARTITIONING KEY | FUNCTION |
|---|---|---|---|
| G1 | E1 | A | A/2 |

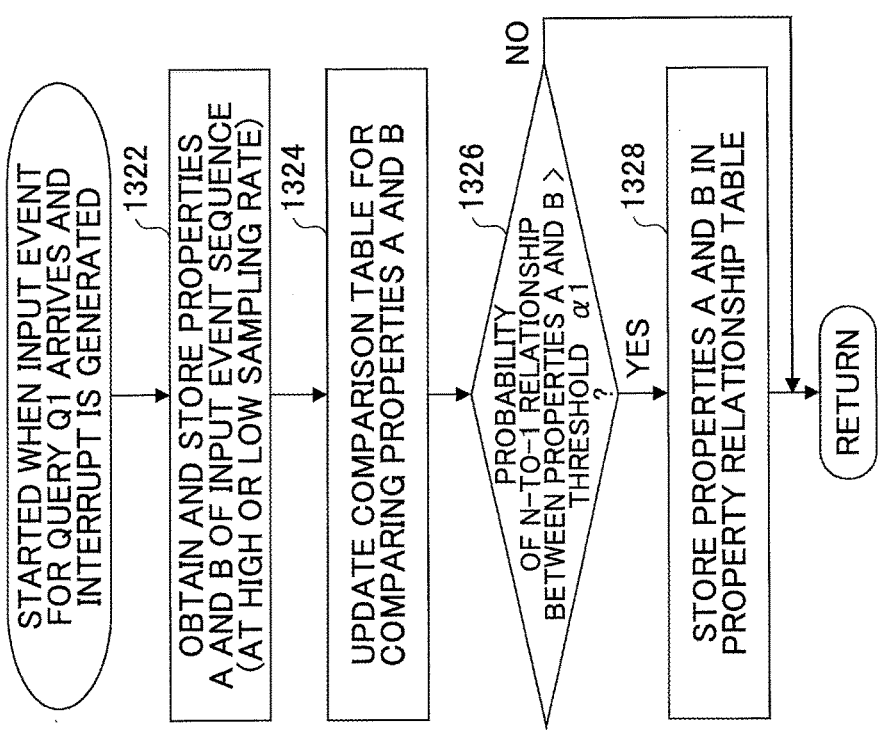
FIG.13B
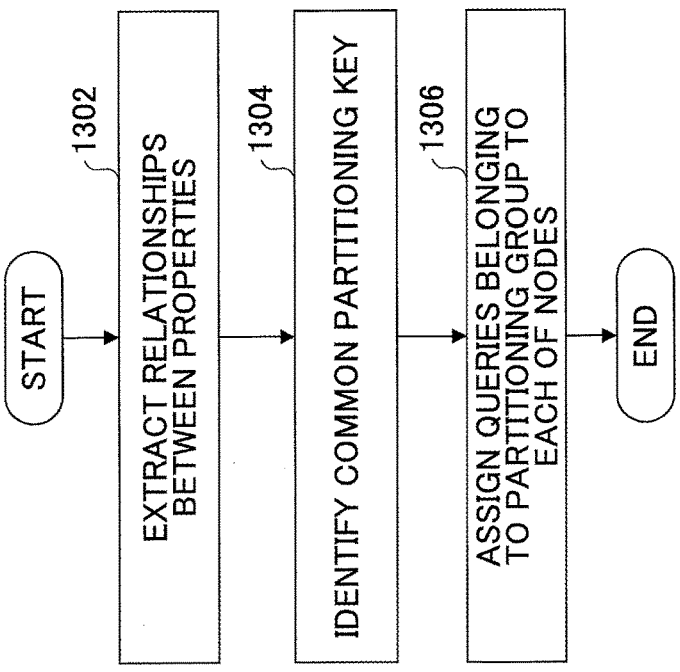
FIG.13A
FIG.13C
| EVENT 2 | EVENT 2 PROPERTY | EVENT 1 | EVENT 1 PROPERTY SET | FUNCTION | MULTI-PLICITY | PROBA-BILITY |
|---|---|---|---|---|---|---|
| E1 | B | E1 | {A} | — | 1:N | 95% |

FIG.14
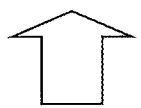
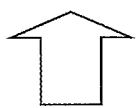

FIG.15A

Q1:
INSERT INTO E2
SELECT A, A/2 AS B
FROM E1;   ～1510

Q2:
INSERT INTO E3
SELECT B, AVG(A) AS C
FROM E2
GROUP BY B;   ～1520

FIG.15B

| EVENT 2 | EVENT 2 PROPERTY | EVENT 1 | EVENT 1 PROPERTY SET | FUNCTION (FORMULA) | MULTI-PLICITY | PROBA-BILITY |
|---|---|---|---|---|---|---|
| E2 | B | E1 | {A} | A/2 | 1:N | 100% |

1530

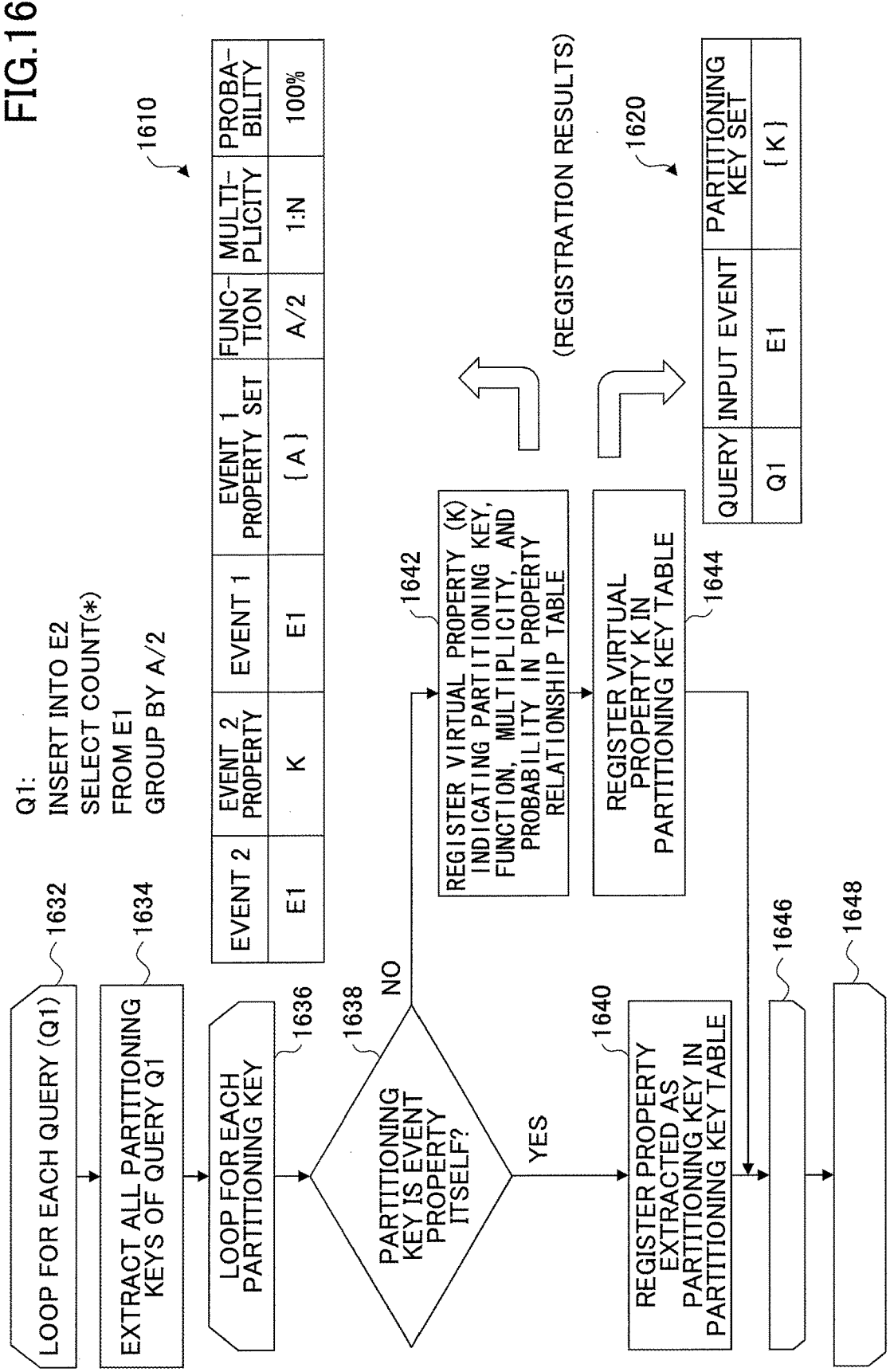

FIG.20

| A | F(A)= A/2 | G(A)= (A+1)/3 | H(A)= (A+4)/6 |
|---|---|---|---|
| 0 | 0 | 0 | 0 |
| 1 | 0 | 0 | 0 |
| 2 | 1 | 1 | 1 |
| 3 | 1 | 1 | 1 |
| 4 | 2 | 1 | 1 |
| 5 | 2 | 2 | 1 |
| 6 | 3 | 2 | 1 |
| 7 | 3 | 2 | 1 |
| 8 | 4 | 3 | 2 |
| 9 | 4 | 3 | 2 |
| ... | ... | ... | ... |

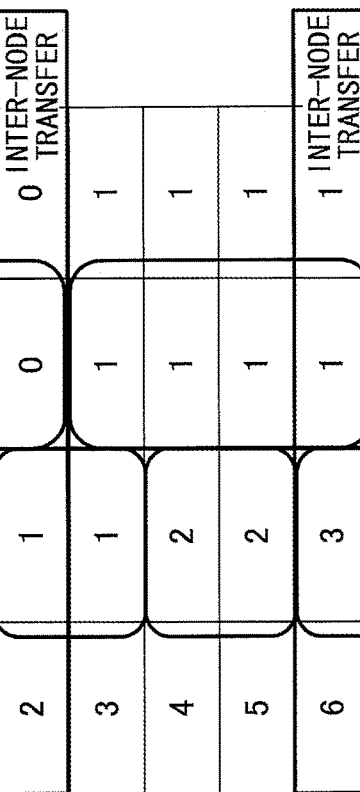

| QUERY | INPUT EVENT | PARTITIONING KEY SET |
|---|---|---|
| Q1 | E1 | {A, C} |
| Q2 | E2 | {B} |
| Q3 | E3 | {B} |

2210

| EVENT 2 | EVENT 2 PROPERTY | EVENT 1 | EVENT 1 PROPERTY SET | FUNCTION | MULTI-PLICITY | PROBA-BILITY |
|---|---|---|---|---|---|---|
| E2 | B | E1 | {A} | A/2 | 1:N | 100% |
| E2 | C | E1 | {C} | C | 1:1 | 100% |
| E3 | B | E2 | {B} | B | 1:1 | 100% |

2220

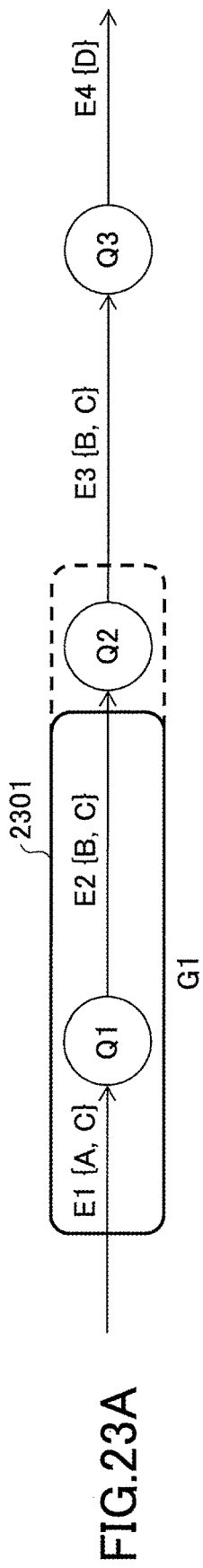

| INPUT EVENT | PARTITIONING KEY | FUNCTION |
|---|---|---|
| E2 | A | A/2 |

PARALLEL DATA STREAM PROCESSING METHOD, PARALLEL DATA STREAM PROCESSING SYSTEM, AND STORAGE MEDIUM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/063983, filed on May 20, 2013, the entire contents of which are incorporated herein by reference.

FIELD

An aspect of this disclosure relates to a parallel data stream processing method, a parallel data stream processing system, and a storage medium.

BACKGROUND

There is an increasing demand for a service for collecting and using big data, i.e., a large amount of data provided from, for example, various information sources, apparatuses, and sensors connected to a network. If a large amount of data generated in the real world can be sequentially processed, it is possible to obtain information in almost real time. For example, there is a demand for a technology that sequentially process a large number of data streams that are constantly provided from various sensors.

An example of such a technology is complex event processing for processing big data. However, the recent spread of smartphones and tablet terminals has drastically increased communication traffic. Also, as more and more people and apparatuses become connected to networks, the communication traffic is expected to increase further. Accordingly, it is necessary to further develop such technologies.

Data (a sequence of events) obtained from a data stream may be stored in a database before extracting information from or processing the data. However, this approach may not always satisfy the need to easily obtain desired information in real time. Accordingly, there is a demand for a technology that can process and analyze a large number of data streams (or a large data stream) in real time (or in almost real time). Also, to meet this demand, a technology for processing data streams in parallel is necessary.

A data stream includes multiple events. Therefore, in the present application, a data stream may also be referred to as an "event sequence".

FIG. 1 illustrates an example of data stream processing. In the example of FIG. 1, a stream processing system 140 sequentially processes three input streams 110, 120, and 130, and outputs two output streams 150 and 160. For example, in the input stream 110, multiple events 111, 112, and 113 are sequentially input to the stream processing system 140.

The stream processing system 140 includes multiple queries 142, 144, 146, 148, and 149. These queries are similar to queries used for processing of a static database. However, queries for a stream processing system are different from queries for a database in that they continuously process input information and output desired information. Also in a stream processing system, an output of a query is used as an input to another query. This is another difference of queries for a stream processing system from queries for a database. Accordingly, a "query" in the present application may additionally include a function that is different from a query for a database.

In FIG. 1, queries are connected by arrows. These arrows indicate data flows (data streams). For example, the output stream 150 output from the stream processing system 140 includes multiple processing results 151 and 152. In the present application, a graph indicating connections among the queries in the stream processing system 140 is referred to as a "query graph". Also in the present application, a program including a group of queries and a relationship among the queries indicated by a query graph is referred to as a "data stream program".

A data stream program is written in a query language similar to a Structured Query Language (SQL) used for static databases. Examples of data stream program languages include a Continuous Query Language (CQL) (see, for example, Arasu, Arvind, Shivnath Babu, and Jennifer Widom. "CQL: A language for continuous queries over streams and relations" Database Programming Languages. Springer Berlin Heidelberg, 2004; http://link.springer.com/chapter/10.1007/978-3-540-24607-7_1) and a Complex Event Processing (CEP) Language (see, for example, Interstage Big Data Complex Event Processing Server V1.0.0 Developer's Reference; http://software.fujitsu.com/jp/manual/manualfiles/m120021/j2u11668/01enz200/j2ul-1668-01enz0-00.pdf). In the present application, the Complex Event Processing (CEP) Language is used for descriptions.

In FIG. 2A, two queries Q1 and Q2 are connected by an intermediate stream 240. The queries Q1 and Q2 process an input stream 210, and the query Q2 outputs an output stream 270. The query Q1 includes partitioning keys A and B, and the query Q2 includes partitioning keys B and C.

Here, a partitioning key is a key to be applied to a hash function used to determine destination nodes of data when an input stream is partitioned for parallel distributed processing. For example, in a query with a group by operator, the key used for the group by operator may be used as the partitioning key for that query. When, for example, a program of the query Q1 includes a clause "group by A,B", event fields A and B are recognized as the partitioning keys of the query Q1. When multiple fields are recognized as partitioning keys, a set of partitioning keys is referred to as a "partitioning key set". Similarly, in a query with a join operator, the join key(s) used for the join operator may be used as the partitioning key(s) of that query.

Further, in the present application, a function indicating a relationship between properties of an input event and an output event of a query is also treated as a partitioning key. Here, a property indicates an attribute of data belonging to an event. An event has one or more properties. Also, a property may be used as a partitioning key.

FIG. 2B illustrates an example where the data stream program of FIG. 2A is executed in a parallel distributed manner to process the input stream 210.

The input stream 210 is expressed in a format similar to a table used for a database. The input stream 210 has multiple properties {A,B,C}. Also, the input stream 210 includes multiple events 212, 214, 216, and 218 that are arranged in time series. The query Q1 is assigned to each of a node 232 and a node 234. Here, a node may indicate, for example, a physical machine or a virtual machine. In this example, distributed processing of the query Q1 is performed by two nodes 232 and 234. At a point 220, to distribute the input stream 210 to the node 232 and the node 234, the input stream 210 is partitioned into a stream 221 and a stream 222 by applying a partitioning key set {A, B} to an appropriate hash function. The stream 221 includes an event 212a and an event 214a that sequentially arrive at the node 232 and are processed. The stream 222 includes an event 216a and an event 218a that sequentially arrive at the node 234 and are processed. As the hash function, a technology for a static database may be used. For example, a hash table may be used. In this case, various hash functions for partitioning the input stream 210 into two streams 221 and 222 using the partitioning key set {A, B} may be used.

Also in FIG. 2B, the query Q2 is assigned to each of a node 252 and a node 254. The query Q2 has a partitioning key set {B, C} and is different from the query Q1. Therefore, an event 212b from the node 232 and an event 216b from the node 234 are processed by the query Q2 of the node 252. Similarly, an event 214b from the node 232 and an event 218b from the node 234 are processed by the query Q2 of the node 254.

For this purpose, an output of the node 232 needs to be partitioned into a stream 242 and a stream 244 by using the partitioning key set {B, C} of the query Q2 and an appropriate hash function to send the corresponding events to the node 252 and the node 254. Similarly, an output of the node 234 needs to be partitioned into a stream 246 and a stream 248 by using the partitioning key set {B, C} of the query Q2 and an appropriate hash function to send the corresponding events to the node 252 and the node 254.

Thus, in the example of FIG. 2B, even though the queries Q1 and Q2 are executed in parallel using four nodes 232, 234, 252, and 254, communications via four streams 242, 244, 246, and 248 occur among the four nodes 232, 234, 252, and 254. These communications consume network resources of the nodes.

US Patent Application Publication No. 2010/0030741, for example, discloses a method that receives a query plan including multiple queries, classifies the queries, computes an optimal partition set for each of the queries, and reconciles the optimal partition set of each of the queries with at least one subset of queries. The method also selects at least one reconciled optimal partition set to be used by each of the queries, and stores the selected at least one reconciled optimal partition set in a computer readable medium.

Japanese Patent No. 4925143, for example, discloses a technology for analyzing a cause of a result of a stream data processing system taking into account a process performed by a unique window operator used in the stream data processing system.

Also, Japanese Laid-Open Patent Publication No. 2011-76153, for example, discloses a technology for automatically generating a query for complex event processing based on an event log. In this technology, patterns of combinations of attribute values frequently appearing in the event log are obtained, and frequently-occurring events are automatically generated based on the obtained patterns. Next, a frequently-occurring event sequence where labeled frequently-occurring events are arranged in the order of occurrence is generated. Then, a query for detecting the occurrence of an incident is generated based on the frequently-occurring event sequence.

SUMMARY

According to an aspect of this disclosure, there is provided a non-transitory computer-readable storage medium storing a data stream processing program that causes a computer to execute a process. The process includes extracting a relationship between properties included in events in a data stream from the data stream itself, definitions of queries for processing the data stream, or both of the data stream and the definitions of the queries; specifying a common partitioning key common to a subset of the queries to be grouped into a partitioning group based on partitioning keys in the definitions of the queries, the relationship between the properties, and a probability of the relationship; and assigning the subset of the queries belonging to the partitioning group to each of parallel nodes provided for parallel distributed processing based on the specified common partitioning key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A through 4C are drawings illustrating examples where a function is used as a partitioning key;

FIG. 5 is a drawing illustrating a function having the least common multiple of period lengths of two functions;

FIGS. 6A through 6D are drawings illustrating examples where inter-node communications occur when a function is used as a common partitioning key;

FIGS. 12A through 12D are exemplary tables stored in a table storage;

FIGS. 13A and 13B are flowcharts illustrating exemplary processes performed by a parallel data stream processing system;

FIG. 13C is a drawing illustrating an exemplary entry of a property relationship table;

FIG. 14 is a drawing used to describe an exemplary process of calculating a probability of a relationship between properties;

FIG. 15A is a drawing illustrating exemplary programs defining queries;

FIG. 15B is an exemplary property relationship table;

FIG. 16 is a flowchart illustrating an exemplary process of extracting a partitioning key set from a query;

FIG. 20 is a drawing illustrating an example where a function usable as a partitioning key for reducing inter-node communications is obtained when a period length of none of two functions is divisible by a period length of the other one of the two functions;

FIGS. 21A and 21B are drawings illustrating examples where a period length of one of two functions is divisible by a period length of the other one of the two functions;

FIGS. 23A through 23C are drawings used to describe an example where another query is added to a partitioning group;

DESCRIPTION OF EMBODIMENTS

The above-described consumption of network resources caused by communications among nodes increases as the number of nodes for parallel distributed processing increases, and is one of the problems that need to be solved to properly achieve parallel distributed processing.

To process a data stream including a large amount of data, it is necessary to find out an appropriate plan for the data stream to be processed. However, with the related-art technologies where a plan is derived from, for example, characteristics of queries, plans (for application of a partitioning group) that can be derived are limited.

An aspect of this disclosure provides a parallel data stream processing method, a parallel data stream processing system, and a storage medium that can reduce data communications among nodes for parallel distributed processing of data streams.

Embodiments of the present invention are described below with reference to the accompanying drawings. The embodiments described below are to facilitate understanding of the present invention, and are not intended to limit the scope of the present invention. Also, the embodiments described below are not mutually exclusive. Therefore, elements in different embodiments may be combined unless they contradict with each other. Also, steps described in claims may be executed in any appropriate order and multiple steps may be executed concurrently where appropriate. The embodiments described below are included in the scope of the claimed invention. The same reference number may be assigned to the same or similar components in multiple drawings.

Figure 1:
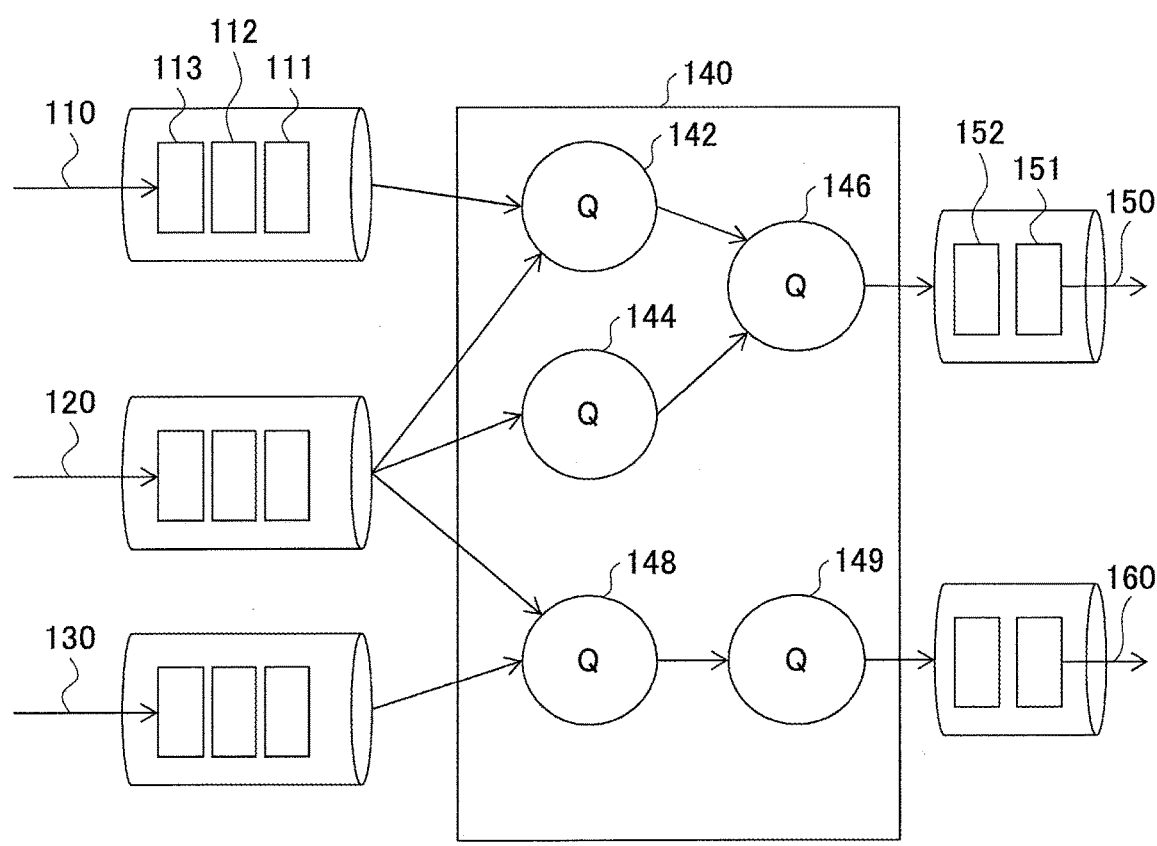
FIG. 1 is a drawing illustrating an outline of exemplary data stream processing using queries.
Figure 2A:
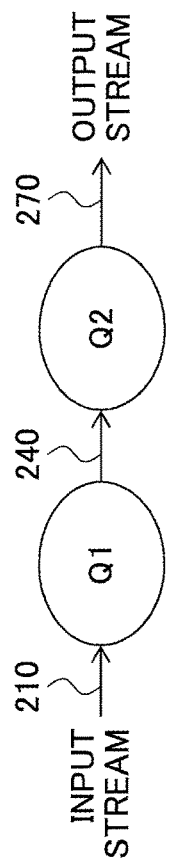
FIGS. 2A and 2B are drawings illustrating an example of parallel distributed execution of queries.
Figure 3A:
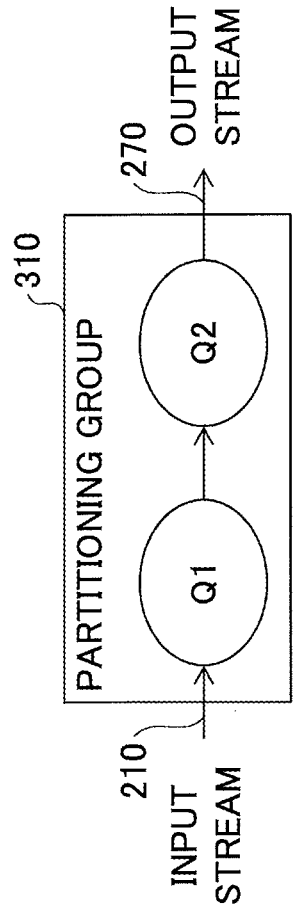
FIGS. 3A and 3B are drawings illustrating an example where queries are grouped into a partitioning group using a partitioning key.
Figure 3B:
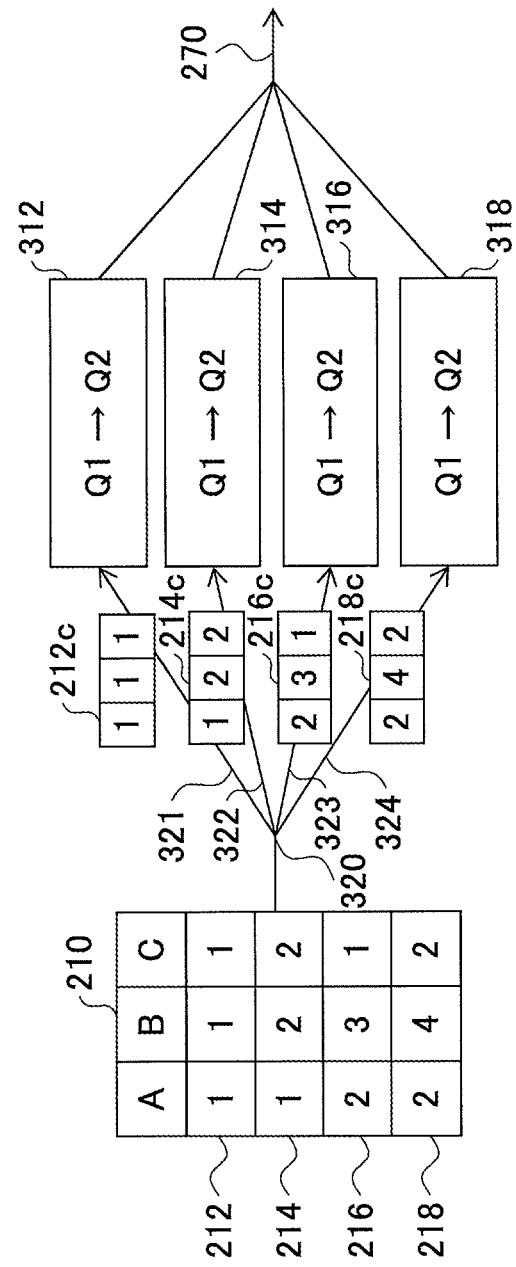

FIGS. 3A and 3B are drawings illustrating an example where queries are grouped into a partitioning group using a partitioning key. FIG. 3A illustrates a query graph of a data stream program that includes a query Q1 and a query Q2 and is similar to the data stream program of FIG. 2A. In FIG. 3A, different from FIG. 2A, the query Q1 and the query Q2 are grouped into a partitioning group 310. The partitioning group 310 has a partitioning key set {B} that is common to the query Q1 and the query Q2. Queries having a common partitioning key set belong to the same partitioning group, and the partitioning group has the common partitioning key set.

Figure 2B:
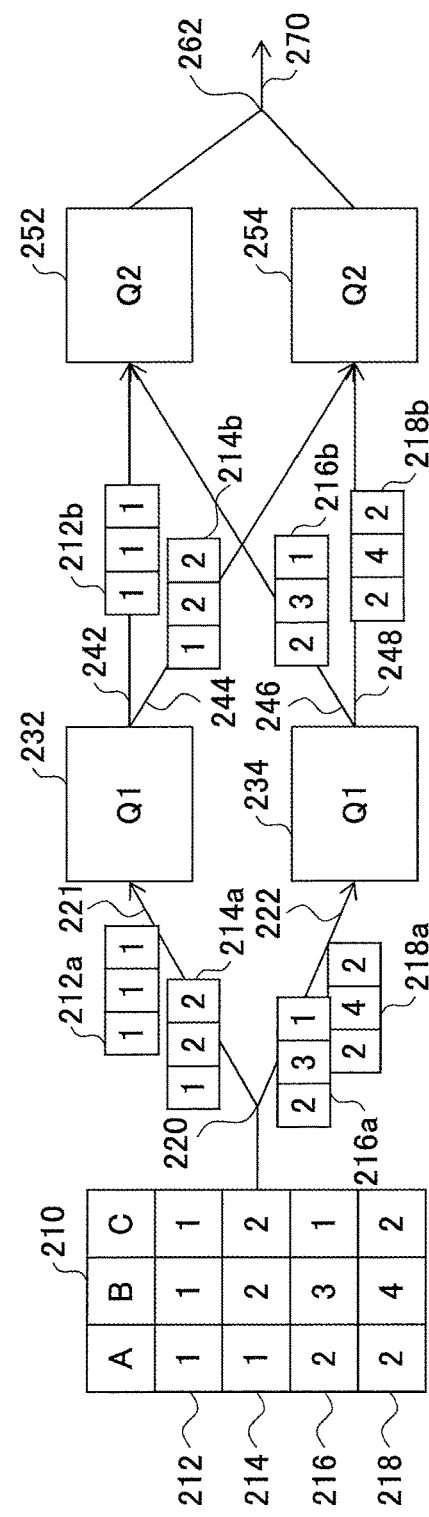

In the example of FIGS. 2A and 2B, only one query is assigned to each node. With the configuration of FIGS. 2A and 2B, when partitioning key sets of queries (Q1 and Q2) do not completely match, "cross" communications occur among nodes to which the queries are assigned.

FIG. 3B illustrates an exemplary configuration for reducing the cross communications among nodes (queries) illustrated in FIG. 2B. In FIG. 3B, the query Q1 and the query Q2 belonging to the partitioning group 310 are assigned to each of four nodes 312, 314, 316, and 318. Here, a partitioning group indicates a subset of one or more queries that can be assigned to the same node.

An input stream 210 is partitioned at a point 320 by applying the partitioning key set {B} to an appropriate hash function. That is, events 212c, 214c, 216c, and 218c are input via streams 321, 322, 323, and 324 to nodes 312, 314, 316, and 318, respectively.

In this case, the input stream 210 is partitioned by applying the partitioning key set {B} common to the query Q1 and the query Q2 to a hash function, and is processed in a parallel distributed manner. With this configuration, in each of the nodes 312, 314, 316, and 318, an output of the query Q1 is simply input to the query Q2. Accordingly, in this case, cross communications (streams 242, 244, 246, and 248) among nodes as in FIG. 2B do not occur. Outputs from the nodes 312, 314, 316, and 318 are combined to obtain an output stream 270.

When a common partitioning key set exists for consecutive queries as in FIG. 3A, those queries are grouped into one partitioning group in a query graph. Then, one or more queries included in a partitioning group are assigned to each node. This configuration makes it possible to prevent cross communications among (parallel) nodes for parallel distributed processing.

The number of nodes to which a partitioning group or queries are assigned for parallel distributed processing may be determined based on, for example, the load of query processing, the number of physical machines available for the nodes, and/or the size of a data stream. An appropriate hash function to which a partitioning key set of a partitioning group is to be applied may be defined based on the determined number of nodes for parallel distributed processing. Also, a hash function may be determined so that events in a data stream can be divided as evenly as possible.

In the example of FIGS. 3A and 3B, it is assumed that partitioning keys A, B and partitioning keys B, C are explicitly written in the respective programs of the query Q1 and query Q2.

FIGS. 4A through 4C are drawings illustrating examples where a function is used as a partitioning key. In FIGS. 4A through 4C, it is assumed that a query Q1 and a query Q2 are defined as indicated below.

Q1:
insert into E2
select A, COUNT(*) as B
from E1
group by A/2;
Q2:
insert into E3
select A, B, COUNT(*) as C
from E2
group by A/3;

Here, A/2 indicates a function that divides A by 2 and truncates digits after the decimal point of the quotient. A/3 indicates a function that divides A by 3 and truncates digits after the decimal point of the quotient.

In FIG. 4A, the query Q1 is assigned to each of a node 401 and a node 402, and input events are hashed by (A/2)%2 at a point 410. Then, events are also hashed by (A/3)%2 at each of the node 401 and the node 402. Here, K % N indicates applying a partitioning key set K to a hash function that outputs N hash values. In the above example, a function F(A)=A/2 and a function G(A)=A/3 are used as partitioning key sets.

The function F(A)=A/2 is a type of mathematical function called a step function. The value of F(A) increases by 1 each time the value of A increases by 2, but is fixed until the value of A increases by 2. The function G(A)=A/3 is also a step function. The value of G(A) increases by 1 each time the value of A increases by 3. It is assumed that a step function, which increases at regular intervals based on the value of A, has periodicity, and the interval of A at which the value of the function increases is referred to as a "period length". In this example, the period length of the function F(A) is 2, and the period length of the function G(A) is 3.

FIG. 4C is a graph illustrating a relationship between the function F(A) and the value of A. This graph indicates that a period length β of F(A) is 2.

When two different functions are used as partitioning key sets of two consecutive queries and there is a one-to-one relationship between the two functions, either one of the two functions can be used to group the two queries into a partitioning group. For example, this applies to a case where the two functions are consecutive linear functions. However, when the two functions are step functions having periodicity as described above, it is not possible to simply group two queries into a partitioning group.

In the case of FIG. 4A, an input event sequence E1 is partitioned at the point 410 by using a hash function (A/2)%2, and the query Q1 is executed at the node 401 and the node 402 in a parallel distributed manner. At this point, input events can be efficiently processed by the two nodes 401 and 402 that independently execute the query Q1 in parallel. However, because the hash function (A/3)%2 is also applied to the events at each of the node 401 and the node 402, cross communications 421 and 422 occur.

In FIG. 4B, to eliminate the cross communications, the query Q1 and the query Q2 are assigned to each of a node 431 and a node 432, and a data stream E1 is hashed by (A/6)%2 at a point 430. This configuration makes it possible to eliminate cross communications between the node 431 and the node 432.

In the above example, the function A/2 and the function A/3 related to properties of input and output events are used for the two consecutive queries Q1 and Q2, respectively, the period length of the function A/2 is 2, and the period length of the function A/3 is 3. In this case, the function A/6 with a period length 6, which is the least common multiple of the period length 2 and the period length 3, is used as a common partitioning key of the queries Q1 and Q2 to assign the queries Q1 and Q2 to one partitioning group.

The partitioning group is assigned to the node 431 and the node 432. The input event sequence E1 is properly hashed by the hash function (A/6)%2 so that cross communications do not occur between the node 431 and the node 432 to which the queries Q1 and Q2 are assigned.

The above descriptions indicate that a common partitioning key can be newly generated even when step functions having periodicity are used as partitioning keys.

In the above description, a function is defined as representing a relationship between a property of an input event and a property of an output event of a query. However, depending on the manner in which a query is defined, a function may be intrinsically present in the query. This is described later with reference to FIG. 26.

FIG. 5 is a drawing illustrating values that can be taken by the function F(A)=A/2, the function G(A)=A/3, and the function H(A)=A/6 having a period length that is the least common multiple of the period lengths of the functions F(A)=A/2 and G(A)=A/3, in association with values of A. A period 521 of H(A) includes periods 501, 502, and 503 of F(A) and periods 511 and 512 of G(A).

Accordingly, a boundary of a period (i.e., a boundary between consecutive periods) of F(A) and a boundary of a period of G(A) coincide with a boundary of a period of H(A). Cross communications among nodes can be avoided by hashing the input event sequence E1 (by, for example, H(A) %2), placing the queries Q1 and Q2 in the same partitioning group, and assigning the partitioning group to each of the nodes for parallel distributed processing.

FIGS. 6A through 6D are drawings illustrating examples where inter-node communications occur when a function is used as a common partitioning key. FIG. 6A illustrates an example where a function F(A)=A/2 is used as a partitioning key of the query Q1, a function G(A)=(A+1)/3 is used as a partitioning key of the query Q2, and a function H(A)=A/6 is used as a common partitioning key of a partitioning group including the queries Q1 and Q2.

As illustrated by FIG. 6A, when A=5, misalignment occurs between the period of F(A) and the period of G(A) (i.e., the boundary of the period of F(A) does not coincide with the boundary of the period of G(A)). For this reason, a communication 610 occurs between a node 601 and a node 602 as illustrated by FIG. 6B. At a point 630, an input event sequence (data stream) E1 is hashed using H(A)=A/6.

In this case, when random events are included in the data stream, an inter-node communication occurs at an average frequency of ⅙. This occurrence frequency of inter-node communications is less than the occurrence frequency (⅔) of inter-node communications in a case where the function F(A)=A/2 and the function G(A)=A/3 are simply used as partitioning keys of the query Q1 and the query Q2, respectively.

FIG. 6C illustrates an example where a function F(A)=A/2 is used as a partitioning key of the query Q1, a function G(A)=(A+1)/4 is used as a partitioning key of the query Q2, and a function H(A)=A/4 is used as a common partitioning key of a partitioning group including the queries Q1 and Q2. As illustrated in FIG. 6D, an input event sequence E1 is hashed using H(A)=A/4 at a point 640.

In the case of FIG. 6C, as illustrated by FIG. 6D, an inter-node communication 620 occurs from a node 603 to a node 604 when, for example, A=3. In this case, the average occurrence frequency of inter-node communications is ¼.

This occurrence frequency of inter-node communications is less than the occurrence frequency (2/4) of inter-node communications in a case where the function F(A)=A/2 and the function G(A)=A/4 are simply used as partitioning keys of the query Q1 and the query Q2, respectively.

In the case of FIG. 6A, inter-node communications can be eliminated by using, as a common partitioning key, another function having a period length that is the least common multiple. This is described later with reference to FIG. 20.

The above examples indicate that the frequency of inter-node communications can be reduced by using, as a common partitioning key of the partitioning group including the queries Q1 and Q2, a function having a period length that is the least common multiple of period lengths of functions used as partitioning keys of the queries Q1 and Q2.

Thus, the above examples make it possible to reduce a communication cost even when inter-node communications occur. Accordingly, when the communication cost is less than a predetermined cost, the partitioning group is preferably used. The predetermined cost is an example of a second threshold.

In the case of FIGS. 6C and 6D, because the periods of the functions F(A) and G(A) are always misaligned with each other, it is not possible to eliminate inter-node communications of the partitioning group including the queries Q1 and Q2 even if any other function is used as a common partitioning key.

In the above examples, a function usable as a partitioning key is present in each of two queries. In the examples described below, a function having a period length that is the least common multiple of period lengths of two functions cannot be easily found out.

Figure 7:
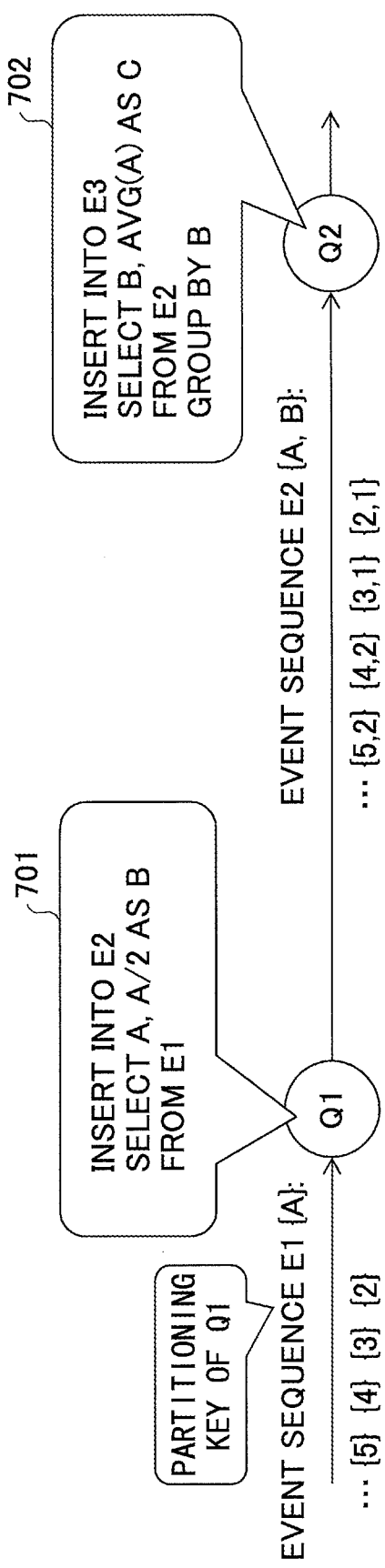
FIG. 7 is a drawing illustrating an example where a partitioning key common to two queries cannot be easily found out.

FIG. 7 is a drawing illustrating an example where a partitioning key common to two queries cannot be easily found out.

As indicated by a program 701 defining a query Q1, the query Q1 does not have an internal state that is provided by, for example, a window or an aggregate function, and therefore can be freely distributed. This indicates that any property of input events can be used as a partitioning key. Because an input event sequence E1 of the query Q1 has a property A, a partitioning key set {A} is used for the query Q1.

A program 702 defining a query Q2 includes an aggregate function AVG(A), and therefore the query Q2 has an internal state. Also, the program 702 includes a clause "GROUP BY B". Therefore, a partitioning key set {B} is used for the query Q2.

As described above, it appears that a common partitioning key cannot be found out for the queries Q1 and Q2. Without a common partitioning key, the queries Q1 and Q2 cannot be grouped into the same partitioning group and assigned to multiple nodes for parallel distributed processing.

However, the program 701 of the query Q1 includes "A/2 as B". Therefore, the query Q1 includes a relationship B=A/2.

Figure 8:
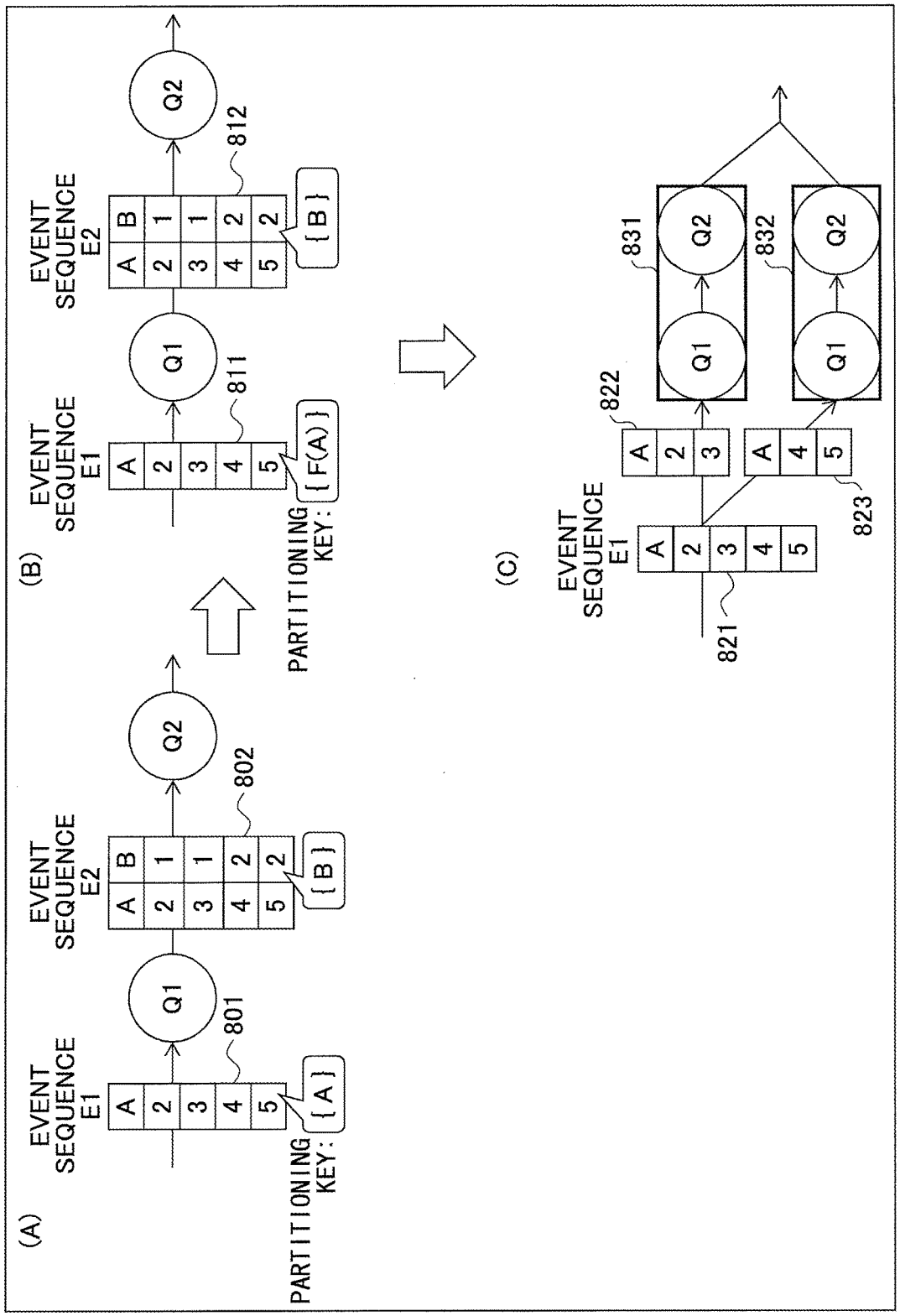
FIG. 8 is a drawing illustrating an example where a relationship between properties is written in a query program.

In FIG. 8, the query Q1 and the query Q2 are the same as those illustrated in FIG. 7. A method of grouping two queries into the same partitioning group using a relationship between properties written in a query program is described with reference to FIG. 8.

In FIG. 8 (A), according to the definition of the query Q1, there is a relationship B=F(A)=A/2 between the property A of an input event sequence E1 (801) and the property B of an output event sequence E2 (802).

As illustrated by FIG. 8 (B), an event sequence E1 (811) and an event sequence E2 (812) are the same as the event sequence E1 (801) and the event sequence E2 (802). In this case, the query Q1 and the query Q2 have the same partitioning key B. In other words, because the relationship B=A/2 exists, the query Q1 and the query Q2 have a function A/2 as the same partitioning key.

FIG. 8 (C) illustrates an example where the query Q1 and the query Q2 are grouped into a partitioning group and assigned to each of a node 831 and a node 832 for parallel distributed processing. In this case, B (i.e., F(A)=A/2) is used as a common partitioning key. Accordingly, an event sequence E1 (821) is hashed by (A/2)%2 (i.e., B %2) to partition the event sequence E1 into two streams 822 and 823.

Thus, even when it appears that a common partitioning key cannot be found out for the queries Q1 and Q2, a common partitioning key can be found out by analyzing a relationship of properties of input and output events of the queries Q1 and Q2.

Figure 9:
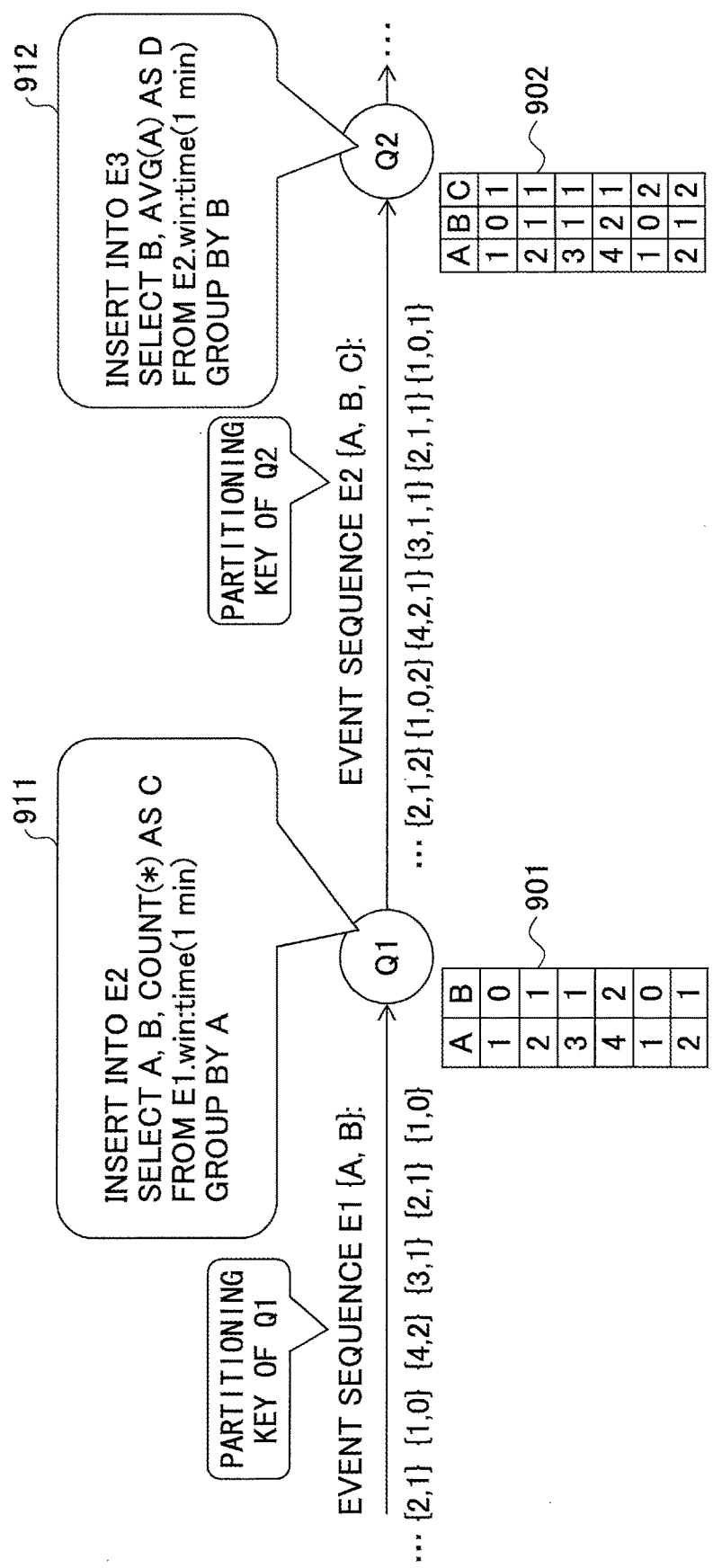
FIG. 9 is a drawing illustrating an example where a dynamic relationship is found out between properties of an input event sequence of a query.

FIG. 9 is a drawing illustrating an example where a dynamic relationship is found out between properties (properties A and B) of an input event sequence E1 of a query.

There is a case where a relationship between properties in an event sequence cannot be found out by analyzing a query program. However, even in such a case, a certain, although not complete, degree of relationship may be intrinsically present between properties in an input event sequence. Also, there is a case where a certain degree of relationship exists between properties within a range of a window of a query even though no special relationship exists between the properties in the long term. In such a case, because a steady relationship does not exist between properties outside of a window of a query, it is difficult, with the related-art technologies, to find out a plan for grouping queries into a partitioning group.

In FIG. 9, a query Q1 is defined by a program 911, and a query Q2 is defined by a program 912. The program 911 of the query Q1 has an internal state as indicated by a syntax "FROM E1.win:time(1 min)" called a time window. This syntax indicates that an input event sequence E1 is accumulated for one minute, and a predetermined process is performed on the accumulated event sequence. Descriptions of other syntaxes are omitted here because they are substantially the same as syntaxes of a query for processing a database. The program 911 also includes "GROUP BY A". Therefore, "A" is extracted as a partitioning key of the query Q1.

The query Q1 has a time window 901, and the query Q2 has a time window 902.

Here, attention is given to multiple events in the time window 901 that are accumulated from the input event sequence E1 by the query Q1. Properties (in this example, A and B) included in input events of the query Q1 are data passively received by the query Q1, and the query Q1 cannot define the relationship between the properties A and B. However, at a certain probability, the properties A and B in multiple events accumulated in the time window 901 may have a relationship. Also, even when no special relationship exists between properties in the long term, a relationship may exist, at a certain probability, between the properties within a range of each time window of a query.

In the example of the time window 901, there is a relationship B=A/2 between the properties A and B. This relationship B=A/2 cannot be extracted from the program 911 of the query Q1. Here, A/2 indicates a function that divides A by 2 and truncates the remainder. With the relationship B=A/2, multiple values of A correspond to one value of B. This relationship is also referred to as a 1-to-N [N is an integer] relationship.

Events accumulated in the time window 901 all (100%) satisfy the 1-to-N relationship. In practice, however, there are cases where not all events satisfy the 1-to-N relationship. These cases are mentioned later with reference to FIGS. 13A through 14. From the program 911 of the query Q1, "A" is extracted as a partitioning key of the query Q1.

In general, when a property X and a property Y have the 1-to-N relationship, the property corresponding to "1" (in this example, X) can function as a partitioning key.

In FIG. 9, the program 912 of the query Q2 also includes a definition of a time window 902 and has an internal state. Also, the program 912 includes a syntax "GROUP BY B". Therefore, "B" is extracted as a partitioning key of the query Q2.

Thus, at this stage, partitioning keys of the queries Q1 and Q2 are different from each other, and no common partitioning key exists. Accordingly, the queries Q1 and Q2 cannot be grouped into the same partitioning group.

Figure 10A:
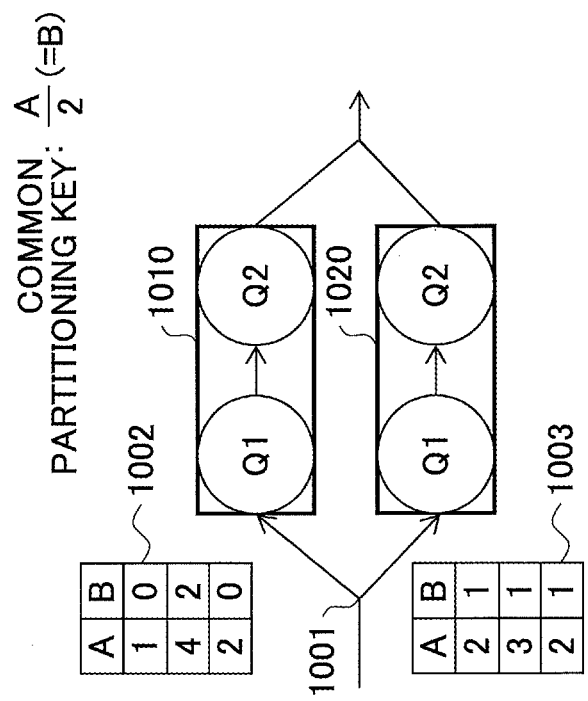
FIGS. 10A and 10B are drawings illustrating an example where a partitioning group including multiple queries is formed taking into account a dynamic relationship between properties included in an event sequence.
Figure 10B:
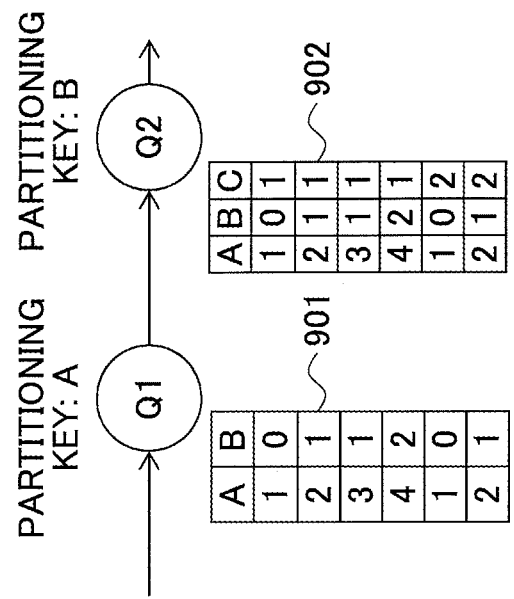

FIGS. 10A and 10B are drawings illustrating an example where a partitioning group including multiple queries is formed taking into account a dynamic relationship between properties included in an event sequence. In FIGS. 10A and 10B, the relationship B=A/2 obtained from the time window 901 is used. FIG. 10A illustrates the partitioning key "A" of the query Q1 and the partitioning key "B" of the query Q2 that obtained from the query programs illustrated in FIG. 9. In the state of FIG. 10A, the query Q1 and the query Q2 are not grouped into a partitioning group.

FIG. 10B illustrates an example where the query Q1 and the query Q2 are grouped into a partitioning group using a common partitioning key "B" (i.e., A/2) based on the relationship B=A/2, and the partitioning group is assigned to each of a node 1010 and a node 1020 for parallel distributed processing.

An input event sequence is hashed by a hash function B %2 at a point 1001 and distributed to the node 1010 and the node 1020. A hashed event sequence 1002 is input to the node 1010, and a hashed event sequence 1003 is input to the node 1020.

In this example, the query Q1 and the query Q2 are grouped into a partitioning group by using a common partitioning key obtained based on a dynamic relationship between properties included in events. Here, there may be a case where not all events satisfy the relationship. In such a case, communications may occur between the node 1010 and the node 1020. However, when the relationship is satisfied at a probability greater than a predetermined level, the inter-node communications can be kept within an acceptable level. The predetermined level is an example of a first threshold.

In the example of FIGS. 9 through 10B, a specific relationship B=A/2 is found between two properties. However, in practice, there may be a case where a 1-to-N relationship can be found out between properties of input events, but no function for defining the relationship can be found out. Even in such a case, as long as a 1-to-N (or 1-to-1) relationship can be found between, for example, properties B and A for the query Q1, it indicates that the property B can be used to aggregate events in the query Q1. Accordingly, when the query Q2 following the query Q1 has the same partitioning key B, the query Q1 and the query Q2 can form a partitioning group having a common partitioning key B. Thus, as long as a 1-to-N relationship can be found between properties A and B at a certain probability, there is no problem even if the relationship cannot be specifically defined.

Also in the example of FIGS. 9 through 10B, each query includes a syntax of a time window that causes events within a predetermined time period to be stored in the query.

A syntax such as a time window for storing and processing multiple events is generally referred to as a "sliding window". When a syntax of a sliding window exists in a query, it is possible to obtain a relationship between multiple properties included in multiple events accumulated by the sliding window.

In the case of a query including no sliding window, events in a data stream input to the query may be sampled at appropriate intervals and stored. The sampling interval is described later with reference to FIG. 13B. Also, the relationship between multiple properties may be successively calculated and stored. In this case, each time a new event is input, the stored calculation result is incrementally corrected.

Figure 11:
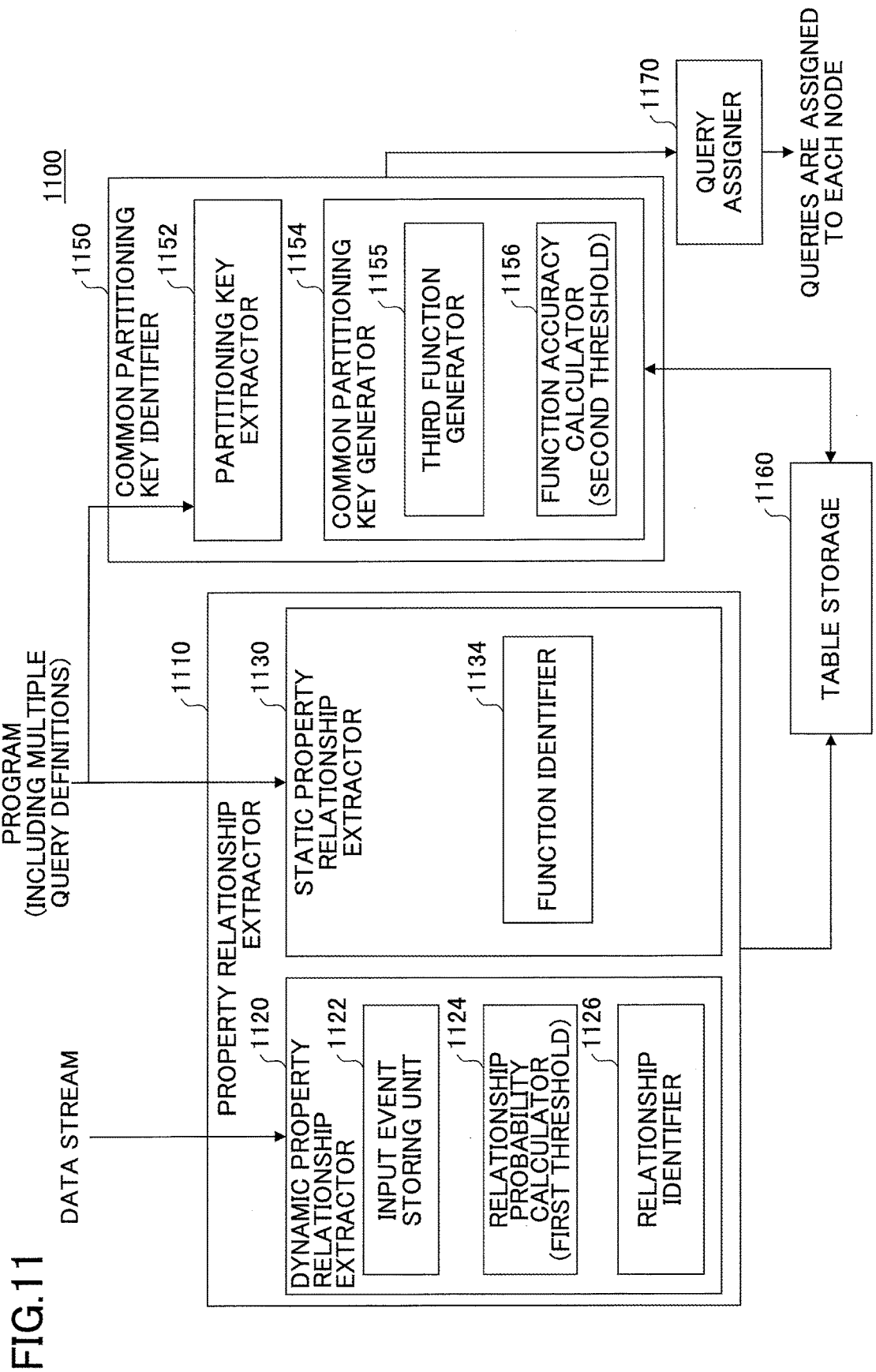
FIG. 11 is a block diagram illustrating an exemplary functional configuration of a parallel data stream processing system.

FIG. 11 is a block diagram illustrating an exemplary functional configuration of a parallel data stream processing system 1100. The parallel data stream processing system 1100 may include a property relationship extractor 1110, a common partitioning key identifier 1150, a table storage 1160, and a query assigner 1170. The parallel data stream processing system 1100 has a function to receive a program including multiple query definitions and assign queries to multiple nodes. The parallel data stream processing system 1100 can use a relationship between properties included in events in a data stream.

The property relationship extractor 1110 may include a dynamic property relationship extractor 1120 and a static property relationship extractor 1130.

The dynamic property relationship extractor 1120 can dynamically extract a relationship between multiple properties by using multiple events in a data stream. Here, "dynamically" indicates using multiple events in a data stream that is dynamic data. A relationship between properties obtained from a data stream is referred to as a "dynamic relationship". The dynamic relationship may change depending on the data stream.

The static property relationship extractor 1130 can statically extract a relationship between multiple properties from a program including multiple query definitions. Here, "statically" indicates using static data, i.e., a program including multiple query definitions. A relationship between properties obtained from a program is referred to as a "static relationship". The static relationship does not change unless the program is changed.

The dynamic property relationship extractor 1120 may include an input event storing unit 1122, a relationship probability calculator 1124, and a relationship identifier 1126.

When a query includes a sliding window, the input event storing unit 1122 stores a number of input events defined by the syntax of the sliding window in the query. On the other hand, when a query includes no sliding window, the input event storing unit 1122 may trap an input event sequence of the query and store the trapped event sequence in a memory. Here, because a huge number of events are input to a query, it is impractical to store all input events of the query in a memory. Therefore, the input event storing unit 1122 may be configured to sample a predetermined number of input events of a query and store the sampled input events in a memory in a first-in-first-out method.

Further, the input event storing unit 1122 may be configured to calculate and store a relationship between input events of a query, and to incrementally update and overwrite the stored calculation result when a new event is input.

The relationship probability calculator 1124 obtains a relationship between properties in events related to each query, and obtains a probability of the relationship.

Here, obtaining a relationship between properties included in all input events of each query may be impractical because there are a huge number of combinations of properties. For this reason, the relationship probability calculator 1124 may be configured to obtain a relationship between properties in events in a sliding window instead of all past events. Also, the relationship probability calculator 1124 may be configured to obtain only an N-to-1 relationship between properties in an input stream and each partitioning key of a query directly connected to the input stream.

Also, when sampling an input stream of a first query, the relationship probability calculator 1124 may be configured to only extract a relationship between a property used as a partitioning key of a second query connected to the output side of the first query and other properties.

Also, when a combination of properties with a probability greater than a predetermined level (e.g., 50%) is found by sampling, the relationship probability calculator 1124 may be configured to obtain events at a shorter sampling interval for the found combination. Then, when a combination of properties with a probability greater than a threshold (e.g., 80%) is found out, the relationship probability calculator 1124 may be configured to determine that there is a relationship between properties. Thus, sampling may be efficiently performed in multiple (two or more) steps.

The relationship identifier 1126 identifies properties that are found out by the relationship probability calculator 1124 as having a highly-probable relationship. The combination of identified properties may be stored in a table in the table storage 1160. Examples of finding out a relationship and calculating the probability of the relationship are described later with reference to FIG. 14. The threshold is an example of a first threshold.

The static property relationship extractor 1130 may include a function identifier 1134. The function identifier 1134 extracts a function representing a relationship between properties from a program including multiple query definitions.

The common partitioning key identifier 1150 may include a partitioning key extractor 1152 and a common partitioning key generator 1154.

The partitioning key extractor 1152 statically extracts partitioning keys from a program including multiple query definitions.

The common partitioning key generator 1154 may include a third function generator 1155 and a function accuracy calculator 1156.

When multiple functions H(A) described above exist, the third function generator 1155 generates (or selects) a function H(A) with which a predicted value of average communication traffic between queries becomes smallest. The third function generator 1155 may instead be provided in the static property relationship extractor 1130.

The function accuracy calculator 1156 determines a characteristic of a function extracted from a program defining queries. When, as described with reference to FIGS. 6A through 6D, the query Q1 and the query Q2 are grouped into a partitioning group and assigned to each of multiple nodes for parallel distributed processing by using the function H(A) having a period length that is the least common multiple of the period lengths of the function F(A) and the function G(A) used as partitioning keys of the queries Q1 and Q2, the function accuracy calculator 1156 predicts an average value of a ratio of inter-node communication traffic to intra-node communication traffic (or a ratio of communication traffic (the number of events transferred) between nodes to communication traffic (the number of events) input to the nodes). The function accuracy calculator 1156 may instead be provided in the static property relationship extractor 1130.

The common partitioning key generator 1154 generates (or selects) a common partitioning key for multiple queries belonging to a partitioning group based on partitioning keys extracted by the partitioning key extractor 1152 and a relationship and a function extracted by the property relationship extractor 1110. The common partitioning key generator 1154 also identifies queries to be grouped into a partitioning group.

The query assigner 1170 assigns queries belonging to a partitioning group to each of multiple (parallel) nodes for parallel distributed processing based on a plan of a common partitioning key generated by the common partitioning key identifier 1150.

With the above configuration, the parallel data stream processing system 1100 can assign appropriate queries to multiple nodes for processing a data stream.

When a change in a dynamic relationship between properties is detected by the dynamic property relationship extractor 1120, the combination of nodes and the plan for assigning queries to each of multiple nodes may be changed. This makes it possible to properly respond to a change in the relationship between properties that may occur over time.

FIGS. 12A through 12D are exemplary tables stored in the table storage 1160.

FIG. 12A illustrates a partitioning key table 1210 that stores partitioning key sets derived directly from a program defining queries. In the present application, a set of partitioning keys is referred to as a "partitioning key set". For brevity, a partitioning key set may be simply referred to as a "partitioning key".

Also in the present application, as described above, in addition to a case where a property of an event itself (which is hereafter referred to as an "event property") is extracted as a partitioning key of a query, a partitioning key may also be obtained from a dynamic relationship found out between properties of events or a function extracted from a query program. Therefore, in addition to partitioning keys and partitioning key sets provided as examples in the tables described below, other types of partitioning keys may also be obtained based on, for example, functions (formulas), multiplicity, and probabilities by the relationship identifier 1126, the function identifier 1134, and the common partitioning key generator 1154.

The partitioning key table 1210 includes a query 1211, an input event 1212, and a partitioning key set 1213 as fields (or information items).

FIG. 12B illustrates a property relationship table 1220 that stores a relationship between two properties. The property relationship table 1220 includes an event 2 (1221), an event 2 property 1222, an event 1 (1223), an event 1 property set 1224, a function (formula) 1225, a multiplicity 1226, and a probability 1227 as fields (or information items). In the event 2 (1221), an output event sequence of a query is basically entered. In an exceptional case, an input event sequence of a query may be entered in the event 2 (1221). This exceptional case is described later with reference to FIG. 13C and FIG. 16.

In the event 2 property 1222, a property of an event sequence entered in the event 2 (1221) is entered.

In the event 1 (1223), an input event sequence of a query is entered.

In the event 1 property set 1224, a property set of an event sequence entered in the event 1 (1223) is entered. In the event 1 property set 1224, multiple properties may be entered. For example, when a query is defined as follows, {A, B} is entered in the event 1 property set 1224.

insert into E2
select A+B as C
from E1

In the function (formula) 1225, a relationship between the event 2 property 1222 and the event 1 property set 1224 is entered. When the relationship can be expressed by a function or a formula, the function or the formula is entered in the function (formula) 1225.

In the multiplicity 1226, a multiplicity of the relationship between the event 2 property 1222 and the event 1 property set 1224 is entered. For example, "1-to-N" (1:N) or "1-to-1" (1:1) is entered in the multiplicity 1226.

In the probability 1227, a probability of the multiplicity is entered. This probability is calculated by the relationship probability calculator 1124 or the function accuracy calculator 1156.

FIG. 12C illustrates a partitioning group list 1230 that includes a partitioning group 1231 and a belonging query 1232 as fields (or information items). In the partitioning group 1231, a group ID for identifying a partitioning group is entered. In the belonging query 1232, queries belonging to the partitioning group are entered.

FIG. 12D illustrates a partitioning group-partitioning key list 1240 that includes a partitioning group 1241, an input event 1242, a partitioning key 1243, and a function 1244 as fields (or information items). In the partitioning group 1241, a group ID for identifying a partitioning group is entered.

In the input event 1242, an input event sequence of the partitioning group is entered. In the partitioning key 1243, a partitioning key applied to the partitioning group is entered. In the partitioning key 1243, multiple partitioning keys (partitioning key set) may be entered.

In the function 1244, a function that is the same as the function entered in the function (formula) 1225 of the property relationship table 1220 is entered.

When a function is entered in the function 1244, the function may be used as a partitioning key.

FIG. 13A is a flowchart illustrating an exemplary process performed by the parallel data stream processing system 1100.

At step 1302, the property relationship extractor 1110 extracts relationships between properties included in an event sequence. The relationships between properties may include a dynamic relationship and a static relationship.

At step 1304, the common partitioning key identifier 1150 extracts partitioning keys based on the relationships between properties, and also identifies a common partitioning key to be applied to one or more queries belonging to a partitioning group.

At step 1306, the query assigner 1170 assigns the one or more queries belonging to the partitioning group to each of nodes for parallel distributed processing.

FIG. 13B is a flowchart illustrating an exemplary process of extracting relationships between properties included in an event sequence. For example, this process may be started when an input event for the query Q1 arrives and an interrupt is generated.

At step 1322, the input event storing unit 1122 obtains, for example, properties A and B of an input event sequence of the query Q1. When a query has a sliding window, this step may be performed on multiple events accumulated by the sliding window in the query. When a query does not have a sliding window, input events may be sampled at a predetermined sampling rate, and a predetermined number of sampled input events may be stored in an appropriate memory (not shown).

In a normal mode, the sampling rate may be set at a low value. When an N-to-1 relationship between properties A and B is found out at a probability greater than a threshold $\alpha 1$ at step 1326 described below, the sampling rate may be changed from the low value to a high value, and the process of FIG. 13B may be performed again using a threshold $\alpha 2$ greater than the threshold $\alpha 1$.

At step 1324, the relationship probability calculator 1124 updates a comparison table for comparing the properties A and B. The comparison table is described later with reference to FIG. 14. In this step, the relationship probability calculator 1124 determines whether the relationship between the properties A and B is N-to-1 or 1-to-1, and calculates the probability of the relationship.

At step 1326, the relationship identifier 1126 determines whether the probability of the N-to-1 (or 1-to-1) relationship between the properties A and B is greater than the predetermined threshold $\alpha 1$. When the probability of the relationship is greater than the threshold $\alpha 1$ (YES at step 1326), the process proceeds to step 1328. When the probability of the relationship is less than or equal to the threshold $\alpha 1$ (NO at step 1326), the process ends. Here, as described above, when the N-to-1 relationship between the properties A and B is found out at a probability greater than the threshold $\alpha 1$, the sampling rate may be changed from a lower value to a higher value, and the process of FIG. 13B may be performed again using the threshold $\alpha 2$ greater than the threshold $\alpha 1$. Each of the thresholds $\alpha 1$ and $\alpha 2$ is an example of a predetermined first threshold.

At step 1328, the properties A and B, the multiplicity, the probability, and so on are stored in a property relationship table.

FIG. 13C illustrates an exemplary entry of a property relationship table 1360 generated at step 1328. The property relationship table 1360 includes an event (1361), an event 2 property 1362, an event 1 (1363), an event 1 property set 1364, a function 1365, a multiplicity 1366, and a probability 1367 as fields (or information items). In the event 2 (1361), an input event sequence E1 is entered. In the event 2 property 1362, the property B is entered. Also in the event 1 (1363), the input event sequence E1 is entered. In the event 1 property set 1364, {A} is entered. In the function 1365, no information is entered. In the multiplicity 1362, "1-to-N" indicating the multiplicity of the relationship between the event 2 property 1362 and the event 1 property set 1364 is entered. In the probability 1367, 95% is entered.

FIG. 13C is based on the example described with reference to FIGS. 9 through 10B. Here, no function is entered in the function 1365. This indicates that because the 1-to-N relationship between the properties B and A is found out at a probability of 95%, it is not necessary to use a function to form a partitioning group. Even in this case, when a specific function has been obtained, the function may be entered in the function 1365. The multiplicity may be either "1-to-N" or "1-to-1".

Also in the example of FIG. 13C, the input event sequence E1 is entered in both of the event 2 (1361) and the event 1 (1363). This is because the property relationship table 1360 stores information related to a relationship between properties of an event sequence input to a query. Properties of an event sequence input to a query are information passively received by the query. Accordingly, properties of an event sequence input to a query are beyond control of the query. The property relationship table 1360 of FIG. 13C stores information related to a relationship between such properties of an input event sequence.

FIG. 14 is a drawing used to describe an exemplary process of calculating a probability of a relationship between properties. An event sequence 1410 in FIG. 14 is, for example, accumulated in a query by a sliding window. An exemplary process of calculating the probability of the 1-to-N relationship between properties B and A of the event sequence 1410 is described below.

First, for each value of B, the number of occurrences of the same combination of values of B and A (the number of occurrences of each value of A) is calculated. A flag is turned on (1) for each entry where the number of occurrences of a value of A is greater than or equal to a predetermined threshold. The flag is turned off (0) for the other entries. In the example of a table 1420 of FIG. 14, the threshold is set at 2. Then, "X" is calculated by a formula "(total of occurrences of values of A in entries where flag is turned on)/(grand total of occurrences of values of A)". X indicates an approximate value representing the probability of the 1-to-N relationship between the properties B and A. In the example of FIG. 14, X is 85%. When multiple values of A exist for each value of B, the median number of values of A may be used as the threshold in the above calculation. When one value of A corresponds to each value of B, the flag may be turned on (1).

Also, the number of values of A corresponding to each value of B may be counted. In this case, the flag is turned on (1) for each entry where the number of values of A is large, and the flag is turned off (0) for other entries. Then, "X" may be calculated by a formula "(total number of values of A in entries where flag is turned on)/(grand total of values of A)".

FIGS. 15A and 15B illustrate an example where a relationship between properties is (statically) extracted from programs defining queries. FIG. 15A is a drawing illustrating exemplary programs defining queries. FIG. 15B is an exemplary property relationship table. A function is extracted from definitions of queries defined in programs. A program 1510 defines a query Q1, and a program 1520 defines a query Q2.

The program 1510 includes a clause "A/2 AS B". From this clause, for example, the following relationship is extracted:

$$E2.B = F(E1.A) = E1.A/2$$

The above formula indicates that a property B of an event sequence E2 is represented by a function of a property A of an event sequence E1, and the function is A/2 that is related to the event sequence E1. The formula also indicates that the multiplicity is 1-to-N. The extracted relationship between the properties A and B is registered in a property relationship table 1530 of FIG. 15B.

FIG. 16 is a flowchart illustrating an exemplary process of (statically) extracting a partitioning key set from a query. Although a query Q1 is used in the exemplary process of FIG. 16, the process may also be applied to other queries.

Steps 1632 and 1648 form a pair, and indicate that a process between these two steps is performed for each query. In this process, the query Q1 is used as an example, and it is assumed that a partitioning key is represented by a function (formula). A typical method of extracting a partitioning key from a program defining a query is similar to, for example, a method of extracting a partitioning key to be applied to a hash function used for a parallel hash join process in a database. In another typical method, a partitioning key is extracted from a grouping operator (group by) of an aggregation result. Below, an example unique to the present embodiment is described.

At step 1634, the static property relationship extractor 1130 extracts all (one or more) partitioning keys of the query Q1. FIG. 16 includes an exemplary program defining the query Q1. According to the program, the query 1 receives an event sequence E1 and outputs an event sequence E2. From a syntax "GROUP BY A/2", a function A/2 is extracted as a partitioning key.

Steps 1638 and 1646 form a pair and indicate that a process between these steps is performed for each partitioning key. At step 1638, the static property relationship extractor 1130 determines whether the extracted partitioning key is an event property itself. A property that can be extracted from the program of the query Q1 is a property A of the event sequence E1. On the other hand, the extracted partitioning key is the function A/2. Therefore, in this case, the extracted partitioning key is different from an event property. Accordingly, in this example, the process proceeds to step 1642 (NO at step 1638). When it is determined that the extracted partitioning key is an event property (YES at step 1638), the process proceeds to step 1640.

At step 1642, the function accuracy calculator 1156 registers a virtual property (e.g., K) indicating the partitioning key, a function (formula), a multiplicity, and a probability in a property relationship table 1610.

At step 1644, the function accuracy calculator 1156 registers the virtual property K in a partitioning key table 1620.

Here, the virtual property K is registered in the event 2 property field of the property relationship table 1610 because the extracted function indicates a relationship between multiple properties. That is, it is preferable to register the virtual property K in the property relationship table 1610 to form a relationship K=A/2. The reason for using the virtual property K is described below with reference to FIG. 26.

Figure 26:
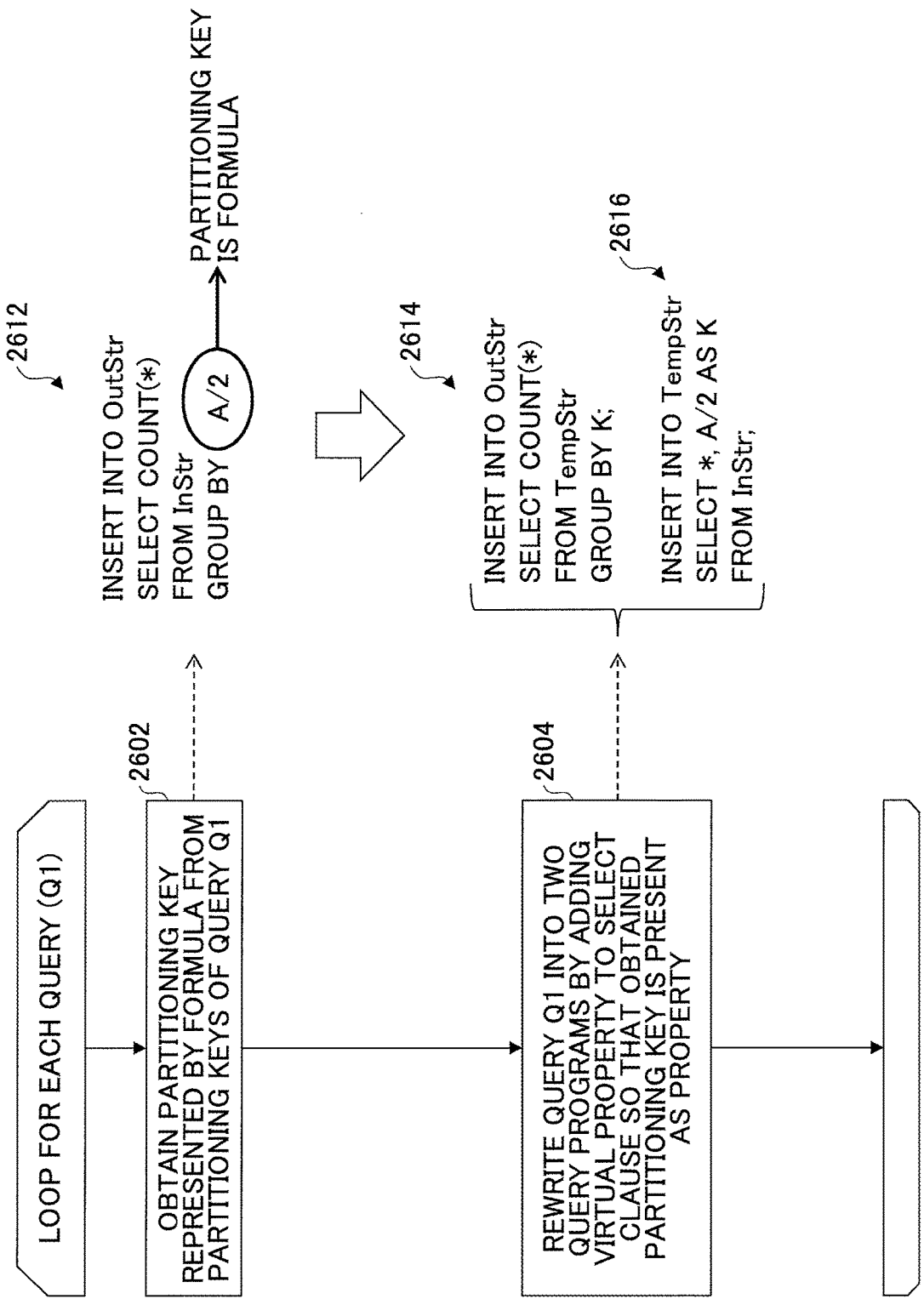
FIG. 26 is a flowchart illustrating an exemplary process of normalizing a query (or a partitioning key set)

FIG. 26 is a flowchart illustrating an exemplary process of normalizing a query (or a partitioning key set). A query 2612 in FIG. 26 corresponds to the program of the query Q1 in FIG. 16.

At step 2602, the function accuracy calculator 1156 obtains a partitioning key represented by a function (formula) from partitioning keys available in the query Q1. In this example, a function (formula) A/2 is obtained.

At step 2604, the function accuracy calculator 1156 rewrites the program 2612 of the query Q1 into two query programs 2614 and 2616 by adding the virtual property K to the SELECT clause so that the obtained partitioning key is present as a property.

The query program 2616 includes a clause "SELECT *, A/2 as K". Accordingly, the property K is present in a virtual stream TempStr. Then, a function (formula) K=A/2 is extracted from the query program 2616. The query program 2614 is executed after the query program 2616 is executed. The query program 2614 receives TempStr as an input event sequence, and outputs OutStr as an output event sequence. Thus, the validity of using the virtual property K can be proved by rewriting a query. Also, using a virtual property makes it possible to ensure consistency between a property relationship table and a partitioning key table, and makes it possible to handle the property relationship table and the partitioning key table in a uniform manner.

Referring back to FIG. 16, at step 1640, the static property relationship extractor 1130 registers the property extracted as the partitioning key in a partitioning key table.

Through the above process, partitioning keys and functions usable to generate partitioning keys are extracted from query programs and stored in the table storage 1160.

Figure 17:
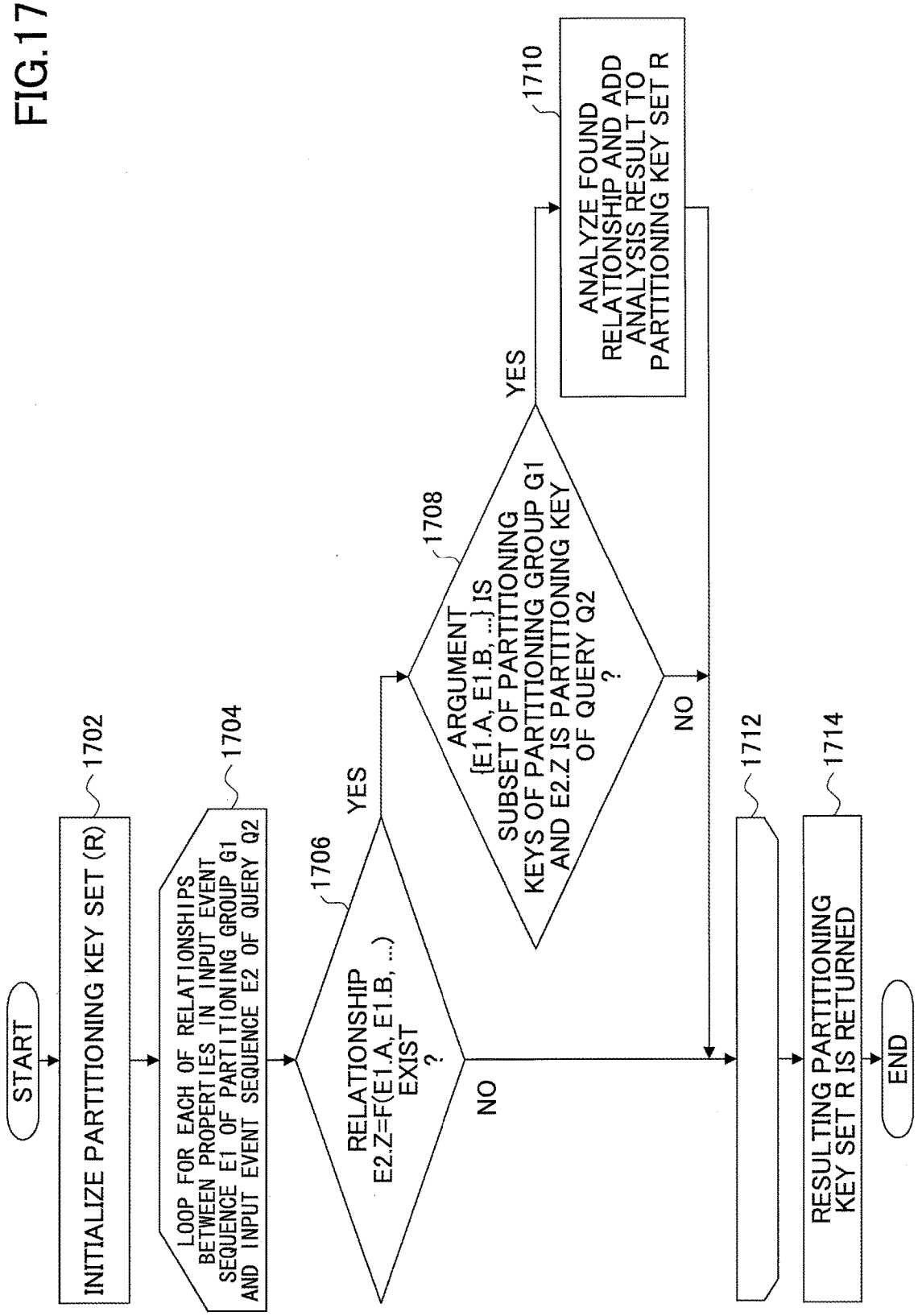
FIG. 17 is a flowchart illustrating an exemplary process of calculating a partitioning key set that is common to a partitioning group and a subsequent query.

FIG. 17 is a flowchart illustrating an exemplary process performed by the common partitioning key identifier 1150 to extract a common partitioning key that is common to multiple queries belonging to a partitioning group. In FIG. 17, it is assumed that a partitioning group G1 has already been generated and there is a query Q2 that follows the partitioning group G1. That is, FIG. 17 illustrates a process of adding the query Q2 to the partitioning group G1. Also in FIG. 17, it is assumed that R indicates a common partitioning key set used when the query Q2 is added to the partitioning group G1. When the partitioning group G1 has not been generated, it is assumed that one query Q1 belongs to the partitioning group G1.

At step 1702, the common partitioning key generator 1154 initializes R for storing a partitioning key (common partitioning key) used when the query Q2 is added to the partitioning group G1. Accordingly, R becomes an empty set.

Steps 1704 and 1712 indicate a loop. More specifically, the common partitioning key generator 1154 performs a process for each of all relationships between properties in an input event sequence E1 of the partitioning group G1 and an input event sequence E2 of the query Q2.

Steps 1704 and 1712 form a pair, and indicate that a process between these two steps is repeated multiple times. More specifically, the common partitioning key generator 1154 processes all relationships found out between properties in the input event sequence E1 of the partitioning group G1 and the input event sequence E2 of the query Q2.

At step 1706, the common partitioning key generator 1154 determines whether a relationship E2.Z=F(E1.A, E1.B, . . . ) exists. Here, E2.Z indicates a property Z in the input event sequence E2. Also, F(X) indicates a function that performs a predetermined process on X. At this step, the common partitioning key generator 1154 refers to a property relationship table that has already been created by the static property relationship extractor 1130. When it is determined that there is a relationship between a property of the input event sequence E2 and properties of the input event sequence E1 (YES at step 1706), the process proceeds to step 1708. When the result of step 1706 is NO, the process proceeds to step 1712.

At step 1708, the common partitioning key generator 1154 determines whether the argument {E1.A, E1.B, . . . } of the function F is a subset of partitioning keys of the partitioning group G1 and E2.Z is a partitioning key of the query Q2. When the result of step 1708 is YES, the process proceeds to step 1710. When the result of step 1708 is NO, the process proceeds to step 1712. When the result of step 1708 is YES, there is a possibility that the function F can be used as a common partitioning key of the partitioning group G1 and the query Q2.

At step 1710, the common partitioning key generator 1154 analyzes the found relationship and adds the analysis result to the partitioning key set R. As an example, there is a case where a relationship B=A/2 is found as a function, A is a subset of partitioning keys of the partitioning group G1, and B is a partitioning key of the query Q2. In this case, B is qualified as a partitioning key common to the partitioning group G1 and the query Q2. At step 1714, the resulting partitioning key set R is returned. A case where a function G usable as a partitioning key is also found in the partitioning group G1 is described below with reference to FIG. 18.

Figure 18:
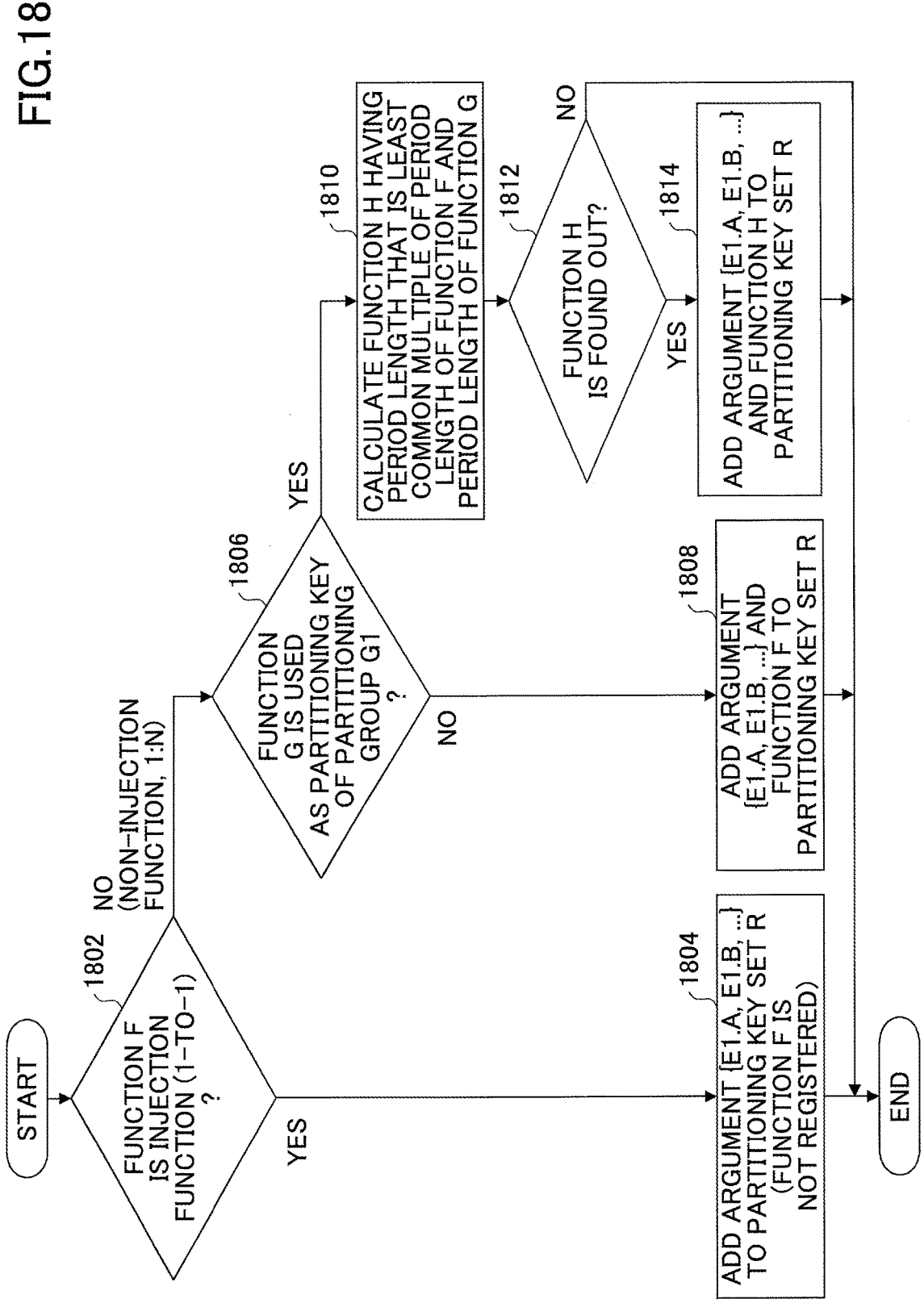
FIG. 18 is a flowchart illustrating an exemplary process of analyzing an extracted function.

FIG. 18 is a flowchart illustrating an exemplary process of analyzing an extracted function. More specifically, FIG. 18 illustrates a process additionally performed at step 1710 of FIG. 17 when a function G used as a partitioning key is also found in the partitioning group G1.

At step 1802, the common partitioning key generator 1154 determines whether the extracted function F is an injection function (which represents a 1-to-1 relationship). When the result of step 1802 is YES, the process proceeds to step 1804. When the result of step 1802 is NO (i.e., when the function represents a 1-to-N relationship), the process proceeds to step 1806.

At step 1804, the common partitioning key generator 1154 adds the argument {E1.A, E1.B, . . . } of the function F to the partitioning key set R. In this case, it is not necessary to add the function F to the partitioning key set R. This is because the function F is an injection function and the argument of the function F can be used as a common partitioning key.

At step 1806, the common partitioning key generator 1154 determines whether a function G is used as a partitioning key of the partitioning group G1. The function G is a function that is already being used as a partitioning key in the partitioning group G1 and takes the same argument as the function F. When the result of step 1806 is YES, the process proceeds to step 1810. When the result of step 1806 is NO, the process proceeds to step 1808.

At step 1808, the common partitioning key generator 1154 adds the argument {E1.A, E1.B, . . . } and the function F to the partitioning key set R. For example, when the function is B=A/2, the argument A and the function A/2 are added to the partitioning key set R.

At step 1810, the third function generator 1155 calculates a new function H having a period length that is the least common multiple of a period length of the function F and a period length of the function G. When functions H having the least common multiple period length have already been calculated by the function accuracy calculator 1156, one of the functions H with high accuracy may be selected. Here, the function accuracy calculator 1156 may be provided in the static property relationship extractor 1130. The period length of the function H is not necessarily limited to the least common multiple of the period lengths of the functions F and G, and may be any common multiple of these period lengths.

At step 1812, the common partitioning key generator 1154 determines whether the function H has been found out. When the result of step 1812 is NO, the process ends. When the result of step 1812 is YES, the process proceeds to step 1814.

At step 1814, the common partitioning key generator 1154 adds the argument {E1.A, E1.B, . . . } and the function H to the partitioning key set R.

Figure 19:
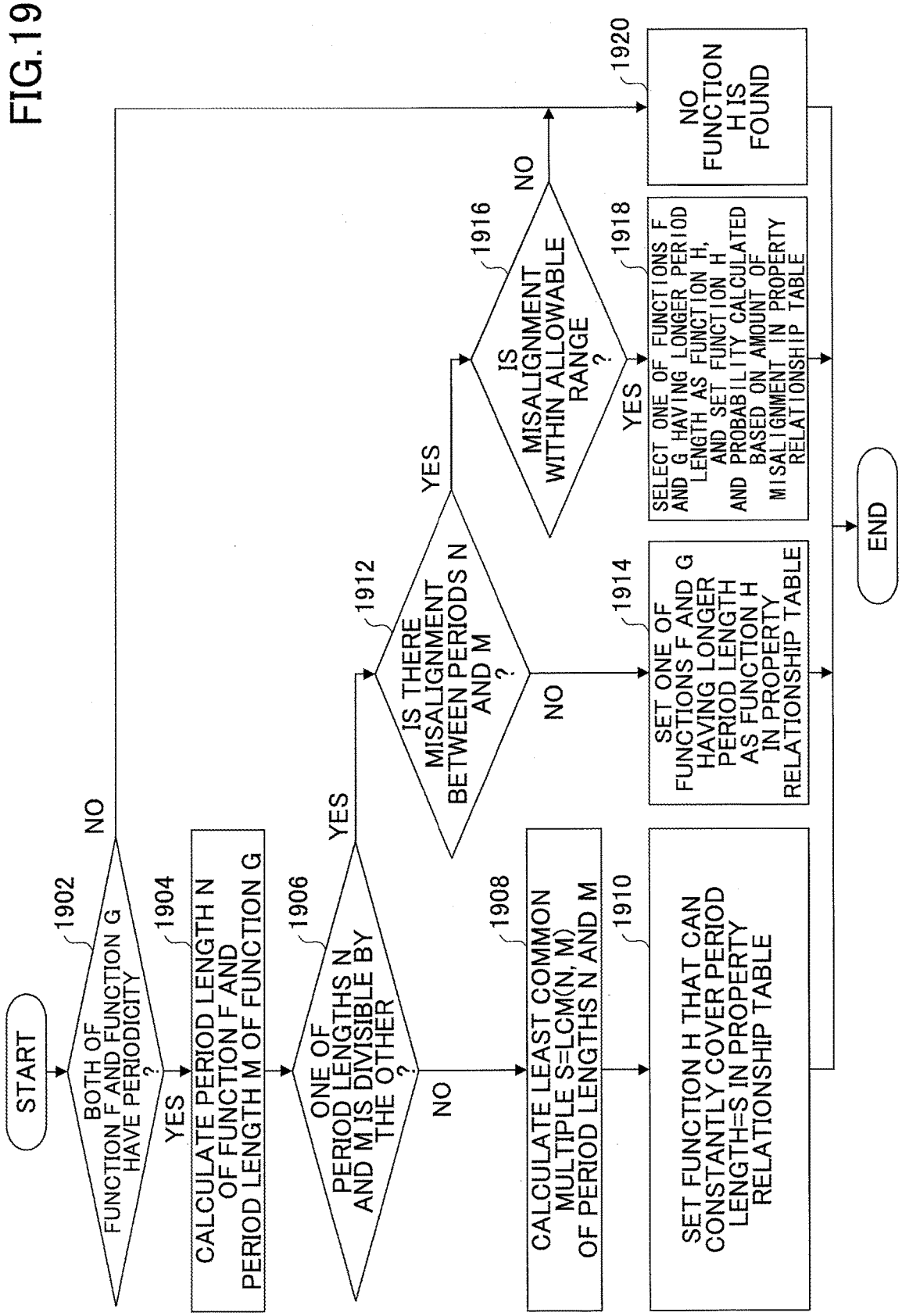
FIG. 19 is a flowchart illustrating an exemplary process of obtaining a function that is usable as a partitioning key for reducing inter-node communications.

FIG. 19 is a flowchart illustrating an exemplary process of obtaining a function that is usable as a partitioning key for reducing inter-node communications. In other words, FIG. 19 illustrates an example of a detailed process of step 1810 of FIG. 18. The function F and the function G used in FIG. 18 are also used in FIG. 19.

At step 1902, the third function generator 1155 determines whether both of the function F and the function G have periodicity. For example, when a function is defined to divide an argument and truncates digits after the decimal point of the quotient (e.g., A/2), the function has periodicity. When the result of step 1902 is YES, the process proceeds to step 1904. When the result of step 1902 is NO, the process proceeds to step 1920.

At step 1904, the third function generator 1155 calculates a period length N of the function F and a period length M of the function G.

At step 1906, the third function generator 1155 determines whether one of the period lengths N and M is divisible by the other one of the period lengths N and M. When the result of step 1906 is YES, the process proceeds to step 1912. When the result of step 1906 is NO, the process proceeds to step 1908.

At step 1908, the third function generator 1155 calculates the least common multiple S=LCM(N, M) of the period length N and the period length M. LCM indicates a function for obtaining the least common multiple.

At step 1910, the third function generator 1155 sets a function H that can constantly cover a period length=S in a property relationship table. When none of the period lengths N and M is divisible by another, there is a position (coinciding position) where a boundary of the period N and a boundary of the period M coincide. The function S is obtained such that the coinciding position matches the boundary of the period S. An example of this case is described later with reference to FIG. 20.

At step 1912, the third function generator 1155 determines whether there is misalignment between the periods N and M. When the result of step 1912 is YES, the process proceeds to step 1916. When the result of step 1912 is NO, the process proceeds to step 1914.

At step 1914, the third function generator 1155 selects one of the function F and the function G that has a longer period length as a function H, and sets the function H in the property relationship table.

At step 1916, the third function generator 1155 determines whether the misalignment between the period lengths N and M is within an allowable range. This step is described later in more detail with reference to FIG. 21B. To determine whether the misalignment is within an allowable range, the third function generator 1155 may be configured to determine whether the ratio of the amount of misalignment to the period length of the function H is less than or equal to a predetermined threshold. The predetermined threshold is an example of a second threshold. When the result of step 1916 is YES, the process proceeds to step 1918. When the result of step 1916 is NO, the process proceeds to step 1920.

At step 1918, the third function generator 1155 selects one of the function F and the function G that has a longer period length as a function H. Then, the third function generator 1155 sets the function H and a probability indicated by the ratio of the amount of misalignment to the period length of the function H in the property relationship table.

At step 1920, the process is terminated because no desired function H is found.

Through the above process, it is possible to obtain a function H usable as a partitioning key for reducing inter-node communications based on the function F and the function G.

FIG. 20 is a drawing illustrating an example where a function H usable as a partitioning key for reducing inter-node communications is obtained when a period length of none of two functions is divisible by a period length of the other one of the two functions.

In FIG. 20, a field 2001 contains values of a property A used as a common argument. A field 2002 contains values taken by a function F(A)=A/2. A field 2003 contains values taken by a function G(A)=(A+1)/3. The function F has a period length 2014. The function G has a period length 2016. Boundaries of the periods (boundaries between sets of values) of the function F and the function G coincide at a position between values 1 and 2 of the property A and at a position between values 7 and 8 of the property A.

There exist multiple functions having a period length that is the least common multiple of the period length of the function F and the period length of the function G. An example of such a function is H(A)=(A+L)/6. Here, L is an integer. For example, a desired function H(A) can be obtained by incrementing L from 0 by 1 and finding a value of L with which the boundary of the period of the function H(A) coincides with the boundaries of the function F and the function G. In the example of FIG. 20, the boundary of the period of the function H(A) coincides with the boundaries of the periods of the function F and the function G when H(A)=(A+4)/6 and H(A)=(A−2)/6. It is possible to appropriately group two queries into one partitioning group by using the function H(A) obtained as described above as a partitioning key.

FIGS. 21A and 21B are drawings illustrating examples where a period length of one of two functions is divisible by a period length of the other one of the two functions. FIG. 21A illustrates an example where the boundary of the period of a function F(A) coincides with the boundary of the period of a function G(A). In FIG. 21A, a field 2101 contains values of a property A. Fields 2102, 2103, and 2104 contain values taken by the function F(A), the function G(A), and a function H(A), respectively. In this case, because there is no misalignment between the periods of the functions F(A) and G(A), as described at step 1914, one of the functions F(A) and G(A) that has a longer period length may be selected as the function H(A).

FIG. 21B illustrates an example where there is misalignment between the periods of functions F(A) and G(A). In FIG. 21B, a field 2111 contains values of a property A. Fields 2112, 2113, and 2114 contain values taken by the function F(A), the function G(A), and a function H(A), respectively. Because the period length of the function G(A) is divisible by the period length of the function F(A), misalignment occurs periodically. In this case, one of the functions F(A) and G(A) that has a longer period length may be selected as the function H(A). In the case of FIG. 21B, assuming that two queries are grouped into the same partitioning group and assigned to each of multiple nodes, an inter-node transfer occurs when, for example, the value of A is 2. Because the period length of H(A) is 4, an average frequency of this inter-node transfer becomes ¼. Accordingly, the accuracy of the function H(A) used as a partitioning key is ¾, i.e., 75%. If the accuracy of 75% is allowable, the function H(A) can be used as a common partitioning key. For example, this may be determined based on whether the accuracy is greater than a predetermined threshold. The predetermined threshold is an example of a second threshold.

The above embodiments are described using functions F, G, and H having periodicity. However, functions having no periodicity may also be used. Exemplary cases where functions having no periodicity are used are described below.

Here, it is assumed that a query Q1 has a function F as a partitioning key, a query Q2 has a function G as a partitioning key, and the function F and the function G take the same argument. The query Q1 and the query Q2 are grouped into the same partitioning group and assigned to each of multiple nodes for parallel distributed processing. In this case, a function H may be selected such that when an input event sequence is hashed by the function H, the frequency of inter-node communications is kept within an allowable limit.

Figures 22A, 22B, 22C:
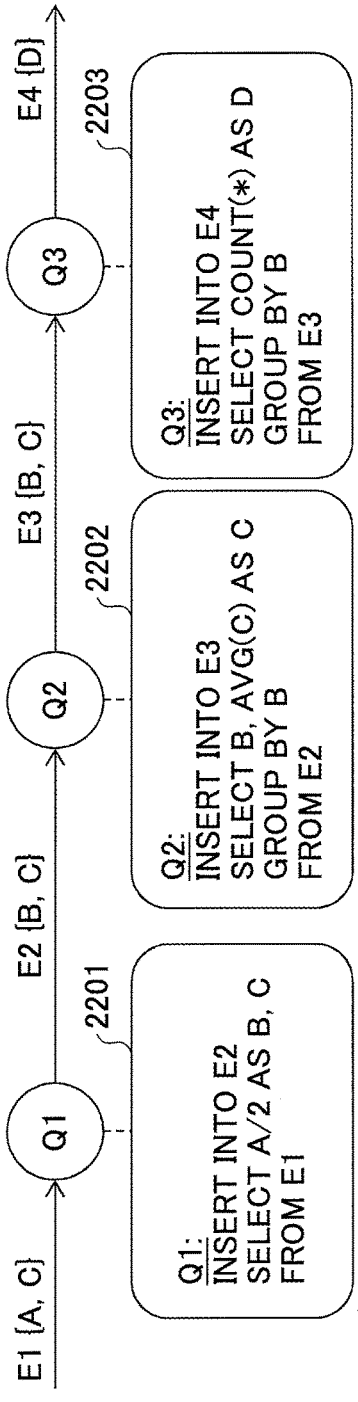
FIGS. 22A through 22C are drawings used to describe an example where queries are grouped into a partitioning group.

FIGS. 22A through 22C are drawings used to describe an example where queries are grouped into a partitioning group. As illustrated in FIG. 22A, properties of an event sequence E1, which is a data stream, are {A, C}. The query Q1 receives the event sequence E1 as an input and outputs an event sequence E2. The query Q2 receives the event sequence E2 as an input and outputs an event sequence E3. A query Q3 receives the event sequence E3 as an input and outputs an event sequence E4. The query Q1 is defined by a query program 2201. The query Q2 is defined by a query program 2202. The query Q3 is defined by a query program 2203.

FIG. 22B illustrates a partitioning key table 2210 for FIG. 22A. FIG. 22C illustrates a property relationship table 2220 for FIG. 22A.

FIGS. 23A through 23C are drawings used to describe an example where a query is added to a partitioning group. FIG. 23A illustrates a stage where the query Q1 is already in a partitioning group G1 (2301), and whether the query Q2 following the query Q1 can be added to the partitioning group G1 (2301) is being examined.

Referring to FIG. 22B, the query Q1 has a partitioning key set {A, C}, and the query Q2 has a partitioning key set {B}. Thus, there is no partitioning key set common to the queries Q1 and Q2. Accordingly, it is not possible to add the query Q2 to the partitioning group G1 to which the query Q1 belongs based only on the partitioning key table 2210.

For this reason, the following relationship is extracted from the property relationship table 2220 of FIG. 22C.

$$E2.B=F(E1.A)=E1.A/2$$

Based on this relationship, it is found out the query Q1 also has a function A/2 as a partitioning key. This corresponds to a case where the result of step 1706 is YES. The function A/2 equals B, and is therefore also a partitioning key of the query Q2. This corresponds to a case where the result of step 1708 is YES, and the function A/2 (i.e., B) is also recognized as a partitioning key at step 1710.

Accordingly, as illustrated by FIG. 23B, the query Q1 and the query Q2 are entered as members of the partitioning group G1 in a partitioning group list.

FIG. 23C illustrates a partitioning group-partitioning key list. In this example, A is entered in a partitioning key field, and A/2 is entered in a function field. In this case, A/2 entered in the function field can also be used as a partitioning key.

Figures 24A, 24B:
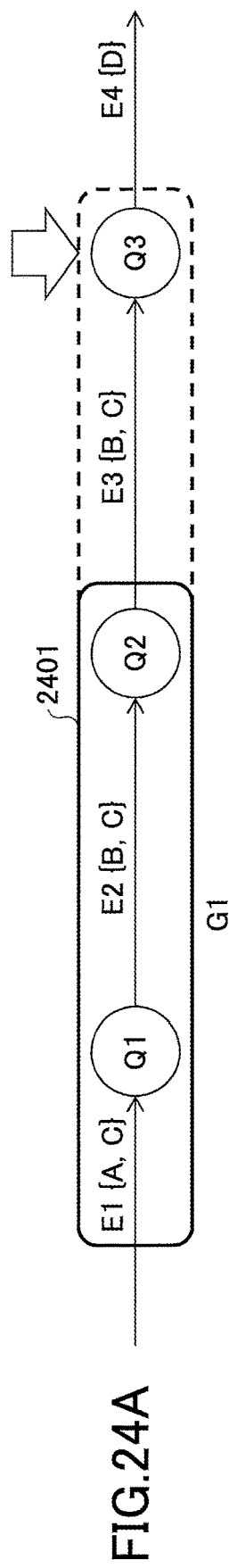
FIGS. 24A and 24B are drawings used to describe an example where still another query is added to a partitioning group.

FIGS. 24A and 24B are drawings used to describe an example where still another query Q3 following the query Q2 is added to the partitioning group G1. In this case, because the event sequence E3 also includes properties, the following relationship can be found out:

$$E3.B=E2.B=E1.A/2$$

This corresponds to a case where the result of step 1706 is YES, and the result of step 1708 is also YES. Accordingly, information items illustrated by FIG. 24B are added to the partitioning group-partitioning key list of FIG. 23C. Thus, the queries Q1, Q2, and Q3 can be grouped into the same partitioning group.

Figure 25:
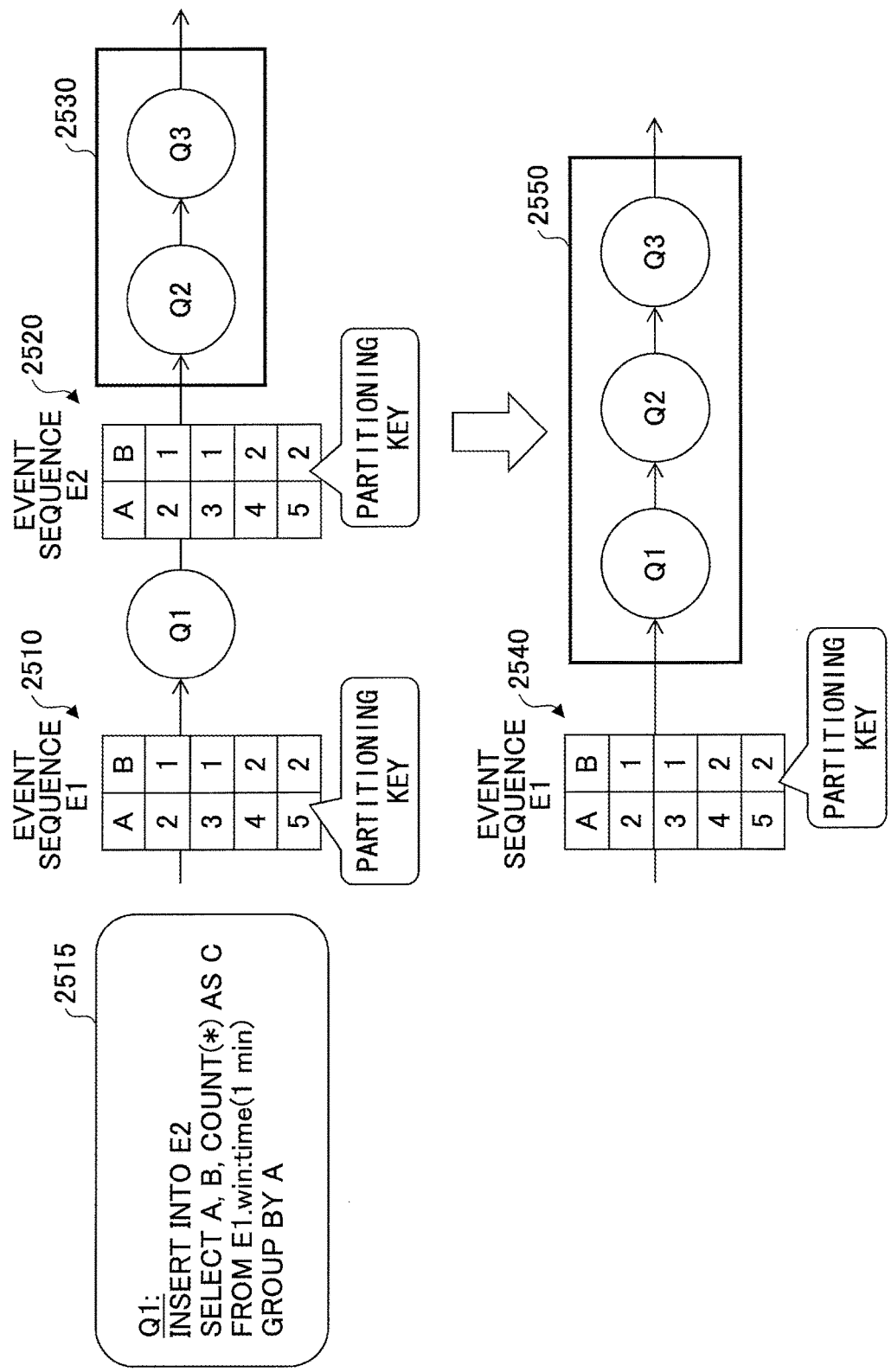
FIG. 25 is a drawing illustrating an example where a partitioning group is formed using a dynamic relationship between properties of an input event sequence.

FIG. 25 is a drawing illustrating an example where a partitioning group is formed using a dynamic relationship between properties of an input event sequence. In FIG. 25, the queries Q2 and Q3 are already in a partitioning group 2530. However, as indicated by an event sequence E1 (2510), the partitioning key of the query Q1 is A. On the other hand, as indicated by an event sequence E2 (2520), the partitioning key of the partitioning group 2530 is B. In this case, because partitioning keys of the query Q1 and the partitioning group 2530 are different from each other, the query Q1 cannot be added to the partitioning group 2530.

However, there is a relationship between properties A and B of the event sequence E1 (2540). In this example, there is a relationship B=A/2. This indicates that in addition to A, B can be used as a partitioning key of the query Q1. Accordingly, the query Q1 and the partitioning group 2530 have a common partitioning key B, and the queries Q1, Q2, and Q3 can be grouped into the partitioning group 2550.

Here, in the case of FIG. 25, because a dynamic relationship between the properties A and B of the event sequence E1 is used, the probability of the relationship may not be 100%. Still, however, if the probability of the relationship is greater than or equal to an allowable level, it is possible to keep inter-node communications within an allowable range by assigning the partitioning group 2550 to each of multiple nodes for parallel distributed processing.

FIG. 26 is already described above in relation to FIG. 16.

Figure 27:
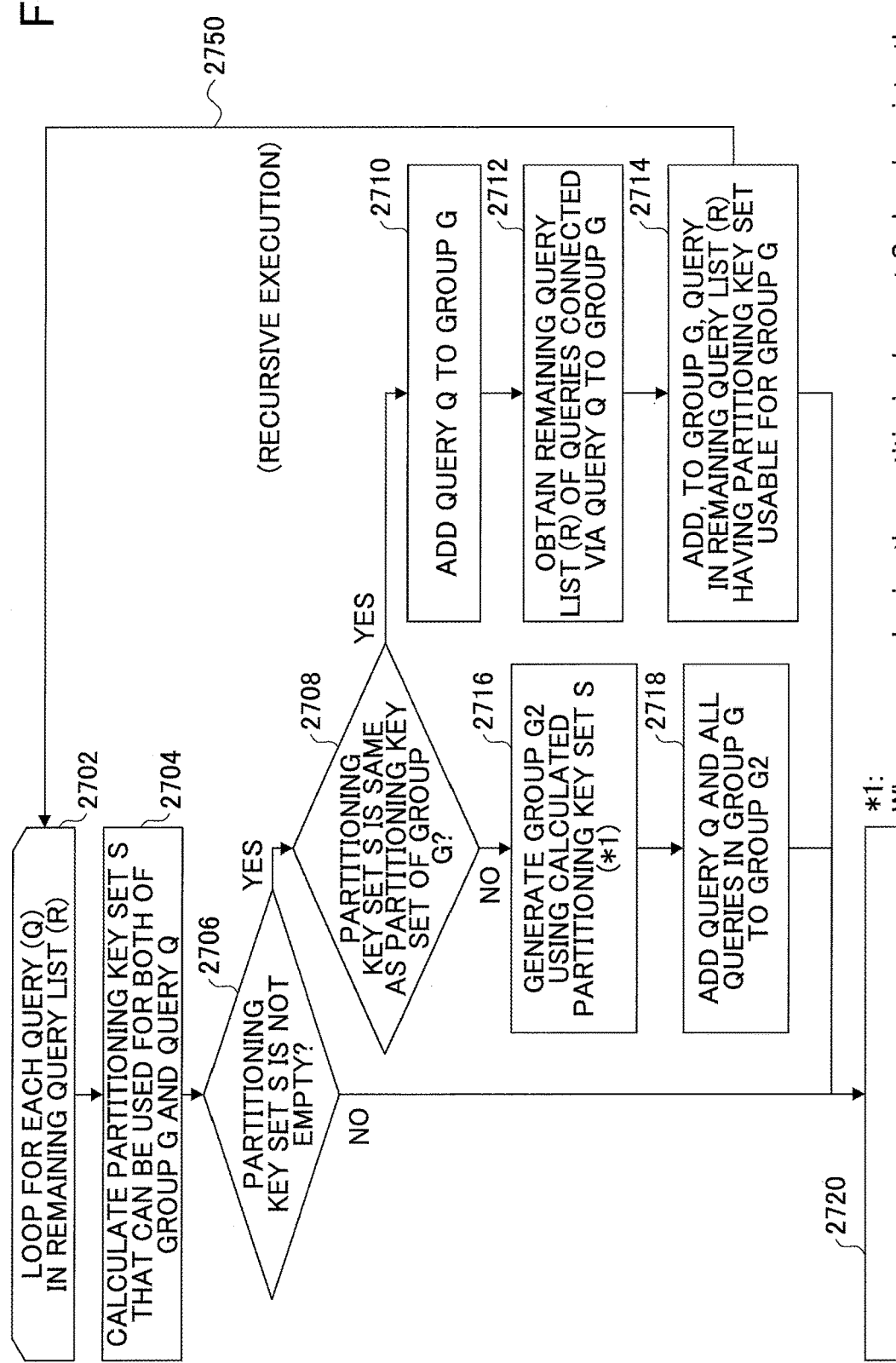
FIG. 27 is a flowchart illustrating an exemplary process of adding a query to a partitioning group.

FIG. 27 is a flowchart illustrating an exemplary process of adding a query to a partitioning group.

Steps 2702 and 2720 indicate a loop, and a process between these steps is recursively performed. In this process, unprocessed queries are stored in a "remaining query list (R)", and processed queries are removed from the remaining query list (R). The process is repeated recursively until the remaining query list (R) becomes empty.

At step 2704, the common partitioning key identifier 1150 calculates a partitioning key set S that can be used as a common partitioning key set for both of a group G and a query Q connected to the group G. When the group G has not been generated, the process may be performed on an assumption that the initial query for a data stream is in the group G.

At step 2706, the common partitioning key identifier 1150 determines whether at least one partitioning key is in the partitioning key set S (i.e., whether the partitioning key set S is not empty). When the result of step 2706 is YES, the process proceeds to step 2708. When the result of step 2706 is NO, the process proceeds to step 2720 and the loop is repeated.

At step 2708, the common partitioning key identifier 1150 determines whether the partitioning key set S is the same as a partitioning key set of the group G. When the result of step 2708 is YES, the process proceeds to step 2710. When the result of step 2708 is NO, the process proceeds to step 2716.

At step 2710, the common partitioning key identifier 1150 adds the query Q to the group G. In this case, because the group G and the query Q have the same partitioning key, the query Q can be added to the group G without changing the partitioning key of the group G.

At step 2712, the common partitioning key identifier 1150 obtains the remaining query list (R) listing queries connected via the query Q to the group G.

At step 2714, the common partitioning key identifier 1150 adds, to the group G, a query in the remaining query list (R) that has a partitioning key common to the query and the group G. Then, step 2702 (or the process between steps 2702 and 2720) is recursively executed.

At step 2716, the common partitioning key identifier 1150 generates a group G2 using the partitioning key set S calculated at step 2704. Here, when a group (existing group) having the partitioning key set S has already been generated, the common partitioning key identifier 1150 does not newly generate the group G2, and adds the query Q to the existing group.

At step 2718, the common partitioning key identifier 1150 adds the query Q and all queries in the group G to the group G2 having the partitioning key set S.

Through the above process, the common partitioning key identifier 1150 can group all queries into one or more partitioning groups.

After one or more partitioning groups are generated, the query assigner 1170 can assign queries belonging to the generated partitioning groups to each of multiple nodes.

Figure 28:
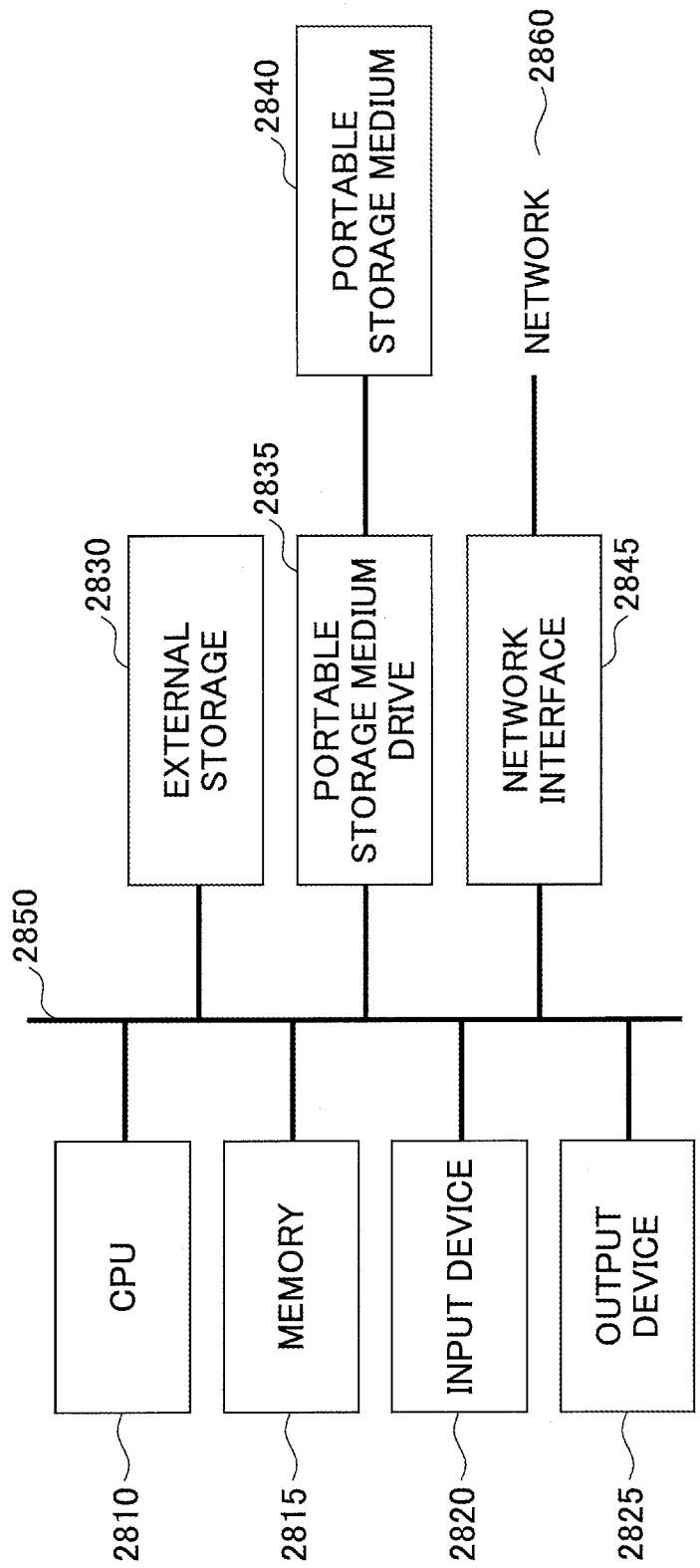
FIG. 28 is a block diagram illustrating an exemplary hardware configuration of a computer implementing a parallel data stream processing system.

FIG. 28 is a block diagram illustrating an exemplary hardware configuration of a computer(s) implementing the parallel data stream processing system 1100. The computer may include a central processing unit (CPU) 2810, a memory 2815, an input device 2820, an output device 2825, an external storage 2830, a portable storage medium drive 2835, and a network interface 2845 that are connected to each other via a bus 2850. The portable storage medium drive 2835 can read and write data from and to a portable storage medium 2840. The network interface 2845 is connected to a network 2860.

Some or all of functional units (components) of the parallel data stream processing system 1100 and processes described above can be implemented by executing one or more programs by the CPU 2810. The programs may be stored in the portable storage medium 2840 that is a non-transitory storage medium. The portable storage medium 2840 may be, for example, a magnetic recording medium, an optical disk, a magneto-optical storage medium, or a non-volatile memory. Examples of magnetic recording media include a hard disk drive (HDD), a flexible disk (FD), and a magnetic tape (MT). Examples of optical disks include a digital versatile disk (DVD), a DVD-random access memory (RAM), a compact disk-read only memory (CD-ROM), a CD-recordable (CD-R), and a CD-rewritable (CD-RW). Examples of magneto-optical storage media include a magneto-optical disk (MO). For example, the CPU 2810 loads programs stored in the portable storage medium 2840 into the memory 2815 and executes the loaded programs to implement some or all of functional units (components) of the parallel data stream processing system 1100 and the above described processes.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a data stream processing program that causes a computer to execute a process comprising:
   extracting a relationship between properties included in events in a data stream from the data stream itself, definitions of queries for processing the data stream, or both of the data stream and the definitions of the queries;
   specifying a common partitioning key common to a subset of the queries based on partitioning keys in the definitions of the queries, the relationship between the properties, and a probability of the relationship;
   grouping the subset of the queries into a partitioning group based on the common partitioning key; and
   assigning the subset of the queries belonging to the partitioning group to each of parallel nodes provided for parallel distributed processing,
   wherein, when functions in the definitions of the queries are used as the partition keys, the specifying the common partitioning key includes
   when a first function defined in a first query of the queries has a first period length and a second function defined in a second query of the queries following the first query has a second period length, obtaining a third function having a third period length that is a least common multiple of the first period length and the second period length;
   calculating a ratio of a number of events caused to be transferred between the parallel nodes due to misalignment between the first period length and the second period length to a number of all events in the data stream input to the parallel nodes based on conditions that the first query and the second query are grouped into the same partitioning group and assigned to each of the parallel nodes using the third function as the common partitioning key; and
   when the calculated ratio is less than or equal to a first threshold, specifying the third function as the common partitioning key.

2. The non-transitory computer-readable storage medium as claimed in claim 1, wherein
   the extracting the relationship between the properties includes
      storing multiple input events input to one of the queries, and
      identifying two properties from the properties in the stored input events, the two properties having one of a 1-to-N relationship and a 1-to-1 relationship (N is an integer) at a probability greater than a second threshold; and
   the common partitioning key is specified based on the identified two properties and the probability of the relationship between the two properties.

3. The non-transitory computer-readable storage medium as claimed in claim 1, wherein
   the extracting the relationship between the properties includes
      when a partitioning key is defined as a function in one of the queries, identifying the function and properties related to the function; and
   the common partitioning key is specified based on the function and the properties related to the function.

4. A method executed by a computer, the method comprising:
   extracting a relationship between properties included in events in a data stream from the data stream itself, definitions of queries for processing the data stream, or both of the data stream and the definitions of the queries;
   specifying a common partitioning key common to a subset of the queries based on partitioning keys in the definitions of the queries, the relationship between the properties, and a probability of the relationship;
   grouping the subset of the queries into a partitioning group based on the common partitioning key; and assigning the subset of the queries belonging to the partitioning group to each of parallel nodes provided for parallel distributed processing, wherein, when functions in the definitions of the queries are used as the partition keys, the specifying the common partitioning key includes when a first function defined in a first query of the queries has a first period length and a second function defined in a second query of the queries following the first query has a second period length, obtaining a third function having a third period length that is a least common multiple of the first period length and the second period length;

calculating a ratio of a number of events caused to be transferred between the parallel nodes due to misalignment between the first period length and the second period length to a number of all events in the data stream input to the parallel nodes based on conditions that the first query and the second query are grouped into the same partitioning group and assigned to each of the parallel nodes using the third function as the common partitioning key; and when the calculated ratio is less than or equal to a first threshold, specifying the third function as the common partitioning key.

5. The method as claimed in claim 4, wherein
the extracting the relationship between the properties includes
storing multiple input events input to one of the queries, and
identifying two properties from the properties in the stored input events, the two properties having one of a 1-to-N relationship and a 1-to-1 relationship (N is an integer) at a probability greater than a second threshold; and
the common partitioning key is specified based on the identified two properties and the probability of the relationship between the two properties.

6. The method as claimed in claim 4, wherein
the extracting the relationship between the properties includes
when a partitioning key is defined as a function in one of the queries, identifying the function and properties related to the function; and
the common partitioning key is specified based on the function and the properties related to the function.

7. A system, comprising:
a processor that executes a process including
extracting a relationship between properties included in events in a data stream from the data stream itself, definitions of queries for processing the data stream, or both of the data stream and the definitions of the queries;
specifying a common partitioning key common to a subset of the queries based on partitioning keys in the definitions of the queries, the relationship between the properties, and a probability of the relationship;
grouping the subset of the queries into a partitioning group based on the common partitioning key; and
assigning the subset of the queries belonging to the partitioning group to each of parallel nodes provided for parallel distributed processing, wherein, when functions in the definitions of the queries are used as the partition keys, the specifying the common partitioning key includes when a first function defined in a first query of the queries has a first period length and a second function defined in a second query of the queries following the first query has a second period length, obtaining a third function having a third period length that is a least common multiple of the first period length and the second period length;

calculating a ratio of a number of events caused to be transferred between the parallel nodes due to misalignment between the first period length and the second period length to a number of all events in the data stream input to the parallel nodes based on conditions that the first query and the second query are grouped into the same partitioning group and assigned to each of the parallel nodes using the third function as the common partitioning key; and when the calculated ratio is less than or equal to a first threshold, specifying the third function as the common partitioning key.

8. The system as claimed in claim 7, wherein
the extracting the relationship between the properties includes
storing multiple input events input to one of the queries, and
identifying two properties from the properties in the stored input events, the two properties having one of a 1-to-N relationship and a 1-to-1 relationship (N is an integer) at a probability greater than a second threshold; and
the common partitioning key is specified based on the identified two properties and the probability of the relationship between the two properties.

9. The system as claimed in claim 7, wherein
the extracting the relationship between the properties includes
when a partitioning key is defined as a function in one of the queries, identifying the function and properties related to the function; and
the common partitioning key is specified based on the function and the properties related to the function.

* * * * *